(12) United States Patent
Miller

(10) Patent No.: US 11,423,091 B2
(45) Date of Patent: Aug. 23, 2022

(54) AUTOMATED METADATA ASSET CREATION USING MACHINE LEARNING MODELS

(71) Applicant: Rovi Guides, Inc., San Jose, CA (US)

(72) Inventor: Kyle Miller, Durham, NC (US)

(73) Assignee: ROVI GUIDES, INC., San Jose, CA (US)

( * ) Notice: Subject to any disclaimer, the term of this patent is extended or adjusted under 35 U.S.C. 154(b) by 263 days.

(21) Appl. No.: 16/883,055

(22) Filed: May 26, 2020

(65) Prior Publication Data

US 2021/0374187 A1  Dec. 2, 2021

(51) Int. Cl.
*G06F 16/33* (2019.01)
*G06F 16/903* (2019.01)
*G06K 9/62* (2022.01)

(52) U.S. Cl.
CPC .... *G06F 16/90344* (2019.01); *G06F 16/3347* (2019.01); *G06K 9/6256* (2013.01)

(58) Field of Classification Search
CPC ............. G06F 16/3344; G06F 16/3346; G06F 16/3347

See application file for complete search history.

(56) References Cited

U.S. PATENT DOCUMENTS

| | | | |
|---|---|---|---|
| 6,523,019 B1* | 2/2003 | Borthwick | G06N 20/00 706/45 |
| 10,922,337 B2 | 2/2021 | Yan et al. | |
| 11,216,701 B1 | 1/2022 | Sim et al. | |
| 2016/0180245 A1* | 6/2016 | Tereshkov | G06N 20/00 706/12 |
| 2016/0357790 A1 | 12/2016 | Elkington et al. | |
| 2018/0137150 A1 | 5/2018 | Osesina et al. | |
| 2019/0043127 A1* | 2/2019 | Mahapatra | G06N 3/0445 |
| 2019/0332486 A1* | 10/2019 | Aseev | G06F 16/907 |
| 2019/0370219 A1* | 12/2019 | Efstathiou | G06N 20/20 |
| 2021/0142191 A1* | 5/2021 | Faruquie | G06N 5/003 |
| 2021/0232908 A1 | 7/2021 | Xian et al. | |
| 2021/0240682 A1 | 8/2021 | Osesina et al. | |
| 2021/0279604 A1* | 9/2021 | Seth | G06F 16/215 |

(Continued)

OTHER PUBLICATIONS

U.S. Appl. No. 16/883,053, filed May 26, 2020, Kyle Miller.
U.S. Appl. No. 16/883,056, filed May 26, 2020, Kyle Miller.

*Primary Examiner* — Grace Park
(74) *Attorney, Agent, or Firm* — Haley Guiliano LLP

(57) ABSTRACT

Systems and methods are described that employ machine learning models to optimize database management. Machine learning models may be utilized to decide whether a new database record needs to be created (e.g., to avoid duplicates) and to decide what record to create. For example, a match machine learning model may be used in combination with an in-database machine learning model and an out-of-policy machine learning model. The match machine learning model may calculate a probability that a newly received database record individually matches respective candidate database records identified in a local database, the in-database machine learning model may calculate a probability that the received database record is in the local database, and the out-of-policy machine learning model may be used to calculate a probability that the newly received database record complies with inclusion rules of the local database.

20 Claims, 19 Drawing Sheets

(56) References Cited

U.S. PATENT DOCUMENTS

2021/0342353 A1* 11/2021 Jagota ............... G06F 16/24564
2021/0374186 A1 12/2021 Miller
2021/0374188 A1 12/2021 Miller

* cited by examiner

| 702 | | | | | | | |
|---|---|---|---|---|---|---|---|
| Mean | Maximum | Minimum | Median | Weighted Mean | Standard Deviation | Variance | Did Human Find That Record Exists In Database? |
| 0.93 | 0.95 | 0.88 | 0.94 | 0.94 | 0.03 | 0.0008 | 1 |
| 0.88 | 0.90 | 0.86 | 0.88 | 0.87 | 0.016 | 0.0002 | 0 |
| 0.94 | 0.94 | 0.84 | 0.94 | 0.94 | 0 | 0.0 | 1 |

FIG. 7

| Show Title | Episode Title | Director | Cast | Description | Genre | Duration | Release Year | Did Human Find Out-Of-Policy? |
|---|---|---|---|---|---|---|---|---|
| The Office | Roy's Wedding | Matt Sohn | Rainn Wilson John Krasinski Jenna Fischer | After Roy's Wedding, Jim and Pam wonder if they still have any secrets they're hiding from each other. | Comedy | 23 | 09/27/2012 | 0 |
| The Office | Roy's Wedding | | Rainn Wilson John Krasinski Jenna Fischer Ed Helms | Pam's ex-fiancé, Roy, gets married. Jim and Pam attend the wedding, but Roy's big day causes them to explore possible secrets in their own marriage. | Satire | 30 | 2012 | 0 |
| The Office Video Blog | Roy's Wedding | | | Roy gets married, and Jim and Pam are there to see it. Pam was once engaged to Roy. | Comedy | | 2012 | 1 |

| Show Title Quality | Episode Title Quality | Cast Quality | Description Length | Genre Quality | Duration Quality | Release Year Quality | What Did Human Decide To Create? |
|---|---|---|---|---|---|---|---|
| {1.0, 1.0, 0.9} | {1.0, 0.9, 0.7} | {0.8, 0.85, 0.75} | {50, 100, 150} | {0.7, 0.8, 0.9} | {0.9, 0.85, 0.7} | {0.8, 0.9, 1.0} | {1, 1, 2, 1, 3, 1, 3} |
| {0.8, 0.9, 0.9, 0.85, 0.8} | {0.8, 0.6, 0.7, 0.7, 0.7} | {0.8, 0.85, 0.8, 0.7, 0.7} | {25, 50, 150, 100, 125} | {0.7, 0.8, 0.8, 0.6, 0.5} | {0.9, 0.8, 0.7, 0.5, 0.7} | {0.8, 0.9, 0.8, 0.7, 0.7} | {2, 3, 2, 3, 2, 1, 2} |
| {1.0, 0.7, 0.6, 0.8} | {0.8, 0.9, 0.8, 0.85} | {0.8, 0.7, 0.85, 0.9} | {45, 50, 105, 110} | {0.7, 0.8, 0.8, 0.9} | {0.8, 0.8, 0.85, 0.7} | {0.8, 0.9, 0.8, 0.7} | {1, 2, 3, 3, 2, 3, 2} |
| {0.7, 1.0} | {0.6, 0.9} | {0.8, 0.85} | {15, 50} | {0.7, 0.8} | {0.9, 0.8} | {0.8, 0.9} | {2, 2, 2, 2, 2, 1, 2} |

FIG. 10

| Candidate Database Record | Title Similarity | Episode Title Similarity | Cast Similarity | Description Cosine Distance | Description Pronoun Overlap | Genre Overlap | Duration Match | Release Year Match | Language Match |
|---|---|---|---|---|---|---|---|---|---|
| Candidate Database Record 1 | 1.0 | 0.95 | 0.75 | 0.12 | 0.8 | 1.0 | 0.1 | 1.0 | 1.0 |
| Candidate Database Record 2 | 0.6 | 0.4 | 0.7 | 0.4 | 0.7 | 0.6 | 0.7 | 0.6 | 1.0 |
| Candidate Database Record 3 | 0.8 | 0.7 | 0.8 | 0.5 | 0.9 | 0.8 | 0.6 | 0.5 | 1.0 |
| Candidate Database Record 4 | 0.8 | 0.8 | 0.8 | 0.35 | 0.8 | 1.0 | 0.6 | 0.8 | 1.0 |

1502

| Title Similarity | Episode Title Similarity | Cast Similarity | Description Cosine Distance | Description Pronoun Overlap | Genre Overlap | Duration Match | Release Year Match | Language Match |
|---|---|---|---|---|---|---|---|---|
| 1.0 | 0.95 | 0.8 | 0.12 | 0.9 | 1.0 | 0.7 | 1.0 | 1.0 |

AUTOMATED METADATA ASSET CREATION USING MACHINE LEARNING MODELS

BACKGROUND

This disclosure is directed to employing machine learning models to optimize database management. In particular, techniques are disclosed for utilizing machine learning models for deciding whether a new database record needs to be created (e.g., to avoid duplicates) and what record to create.

SUMMARY

Database systems are critical in all areas of information technology. As the capacity to store and transmit data continues to grow, efficiently managing and storing such data has become an increasingly important and challenging task for businesses and consumers alike. For an organization (e.g., a corporation, a private entity or a governmental entity), managing a large database presents a multitude of problems, such as determining whether incoming information already exists in the database, determining whether incoming information is appropriate for the particular database, and determining what to create as a database record based on incoming information (e.g., creating a database record to most accurately reflect incoming information while complying with requirements for the particular database). The creation of unneeded database entries (e.g., creating a duplicate record of a database record that already exists in the database, or creating a record that does not belong in the database) unnecessarily consumes finite storage space of the database, and consequently may degrade processing times and performance of the system. Worse, a database that includes multiple entries for the same data may output inconsistent responses to the same queries. Further, if a new database record is incorrectly determined to already exist in the database (e.g., incorrectly matched to an existing database record), and thus is not added to the database, important information could be omitted from the database, which is highly undesirable, as this undermines the reliability of the database and user expectations of comprehensive and accurate database records (e.g., for an organization).

In one approach to managing database storage, a person may review incoming database records and manually match new database records to existing records, or decide what portions of a newly received database record are to be included in a database. However, such a process may be expensive, labor-intensive and prone to human error. Another approach utilizes a system that refers to sets of pre-set heuristic rules in order to determine whether a new database record matches an existing record, or what type of database record should be created. However, such rules may be overly rigid, such as being overly influenced by minor differences in syntax between database records, or overly lax, such as failing to detect important differences between database records.

To overcome these problems, systems and methods are provided herein for updating a local database when a new database record is received using machine learning models. Systems and methods described herein also provide a match machine learning model for calculating respective probabilities that a newly received database record individually matches respective candidate database records identified in the local database. The probabilities output by the match machine learning model may be leveraged by an in-database machine learning model to additionally calculate a probability that the received database record is in the local database (e.g., even if it is uncertain which particular record in the local database corresponds to the received record).

In addition, an out-of-policy machine learning model may be used to calculate a probability that the newly received database record complies with inclusion rules of the local database. Moreover, individual match likelihood (e.g., highest individual match likelihood), the probability that the received database record already exists in the local database, and the probability that the received record is out of policy may be used jointly for the system to make an inclusion decision. For example, each of the probabilities may be combined to determine not only whether the received database record already exists in the local database but also whether the received database record is an appropriate database record for the local database.

When a decision is made to include a record into the database, the database system needs to determine what record to actually create. This decision may be particularly difficult if multiple similar records are received from a remote database or databases. For this purpose, systems and methods described herein provide a selector machine learning model for generating a new database record by selectively choosing attributes from multiple received or incoming database records, to enhance the likelihood that the new database record is accurate and conforms to the local database. For example, once it is determined (e.g., by the match machine learning model, the in-database machine learning model, and the out-of-policy machine learning model, respectively) that the received database record should be created as a new database record and is appropriate for the local database, the selector machine learning model generates a new database record having data items selectively chosen from data items of the multiple received database records.

In some aspects of the disclosure, a database management application is provided that uses a match machine learning model to calculate a probability that a received database record matches a candidate database record identified in a local database. The match machine learning model is trained to accept as input a pair of database records (e.g., computed features scores associated with metadata related to media assets) and output a probability of the database records matching. The database management application further utilizes an in-database machine learning model to accept as input a plurality of probabilities (e.g., computed statistical scores based on such probabilities) computed by the match machine learning model and output a probability that a newly received database record is in the local database.

The database record is received (e.g., by the database management application) from a remote database, and candidate database records in the local database are identified as potentially matching the database record. The database management application may generate candidate lists of features scores by, for each identified candidate database record, generating a respective list of features scores based on the respective candidate database record and the received database record, and each feature score may be associated with a label (e.g., a media asset title). The database management application calculates a plurality of match probabilities by, for each respective candidate database record, inputting the respective candidate database record and the newly received database record into the match machine learning model, to calculate a respective probability of the respective candidate database record matching the newly received database record.

A probability that the received database record is in the local database is calculated by inputting in the in-database machine learning model the plurality of match probabilities (e.g., as a list of statistical scores). For example, there may be a circumstance where two or more of the match probabilities of the candidate database are relatively high, but it is uncertain which of such candidate database records is the one that matches the received record. In such circumstance, a level of confidence could nonetheless be derived that a database record (e.g., one of the two records) is the one that matches the received database record exists in the local database, thereby making it unnecessary to create a new record based on the received record.

The database management application may determine, based on the calculated probability, that a new record for the local database should be created, and the new record for the local database is generated based on the received database record. In this way, received data (e.g., data received from a provider of a metadata asset) may be reconciled with data that already exists in the local database. Thus, the risk of creating duplicate database records in the local database may be minimized, thereby saving storage space, potentially reducing memory requirements of the system, and enabling faster search times than if the duplicate database records had been present in the local database.

In some embodiments, an out-of-policy machine learning model is utilized to calculate a probability of the received database record failing to comply with the inclusion policy rules, in addition to employing the aforementioned match machine learning model and the in-database machine learning model. The database management application determines a combined probability including a largest of the match probabilities amongst the respective probabilities, the probability that the received database record is in the local database, and the probability of the received database record failing to comply with the inclusion policy rules. Based on such combined probability the database management application may determine that a new record for the local database should be created, and such new record is generated for, and stored in, the local database based on the received database record. In this way, multiple machine learning models may be utilized in combination to enhance the likelihood that a new database entry created for the local database complies with relevant policies associated with the database and is not a duplicate of a record already existing in the database.

In some aspects of this disclosure, a selector machine learning model is trained to accept as input a list including labels respectively associated with a set of features scores, and output for each respective label an identifier of one score of the set of features scores associated with the respective label. A database management application determines that a single local database record should be created in the local database based on received database records, where each database record comprises data items associated with each of the labels. An aggregated list is generated (e.g., by the database management application) including each of the labels. For each respective label, such aggregated list includes a respective set of features scores computed based on data items associated with the respective label of the database records.

The aggregated list is input into the selector machine learning model to generate for each respective label an identifier of one of the received database records. A new record for the local database is generated by selecting, for each respective data item of the new record, a data item from a database record of the received database records. Each selected database record is identified by the generated identifier and corresponds to the label that is associated with the respective data item. The new record is then stored in the local database. Accordingly, a single database record may be accurately created based on multiple received database entries (e.g., from multiple remote databases associated with providers of media asset metadata) by selecting a desirable attribute for each label of the generated database record.

The match machine learning model may be trained using training example database record pairs, where each training example database pair is associated with an indicator indicating whether the training example database pair constitutes a previously confirmed match (e.g., confirmed by a human reviewer).

The in-database machine learning model may be trained using training example metadata database records, where each training example metadata database record is associated with an indicator indicating whether the training example constitutes a previously confirmed match (e.g., confirmed by a human reviewer).

The out-of-policy machine learning model may be trained using a plurality of training examples, where each training example includes an indicator indicating whether the training example metadata pair fails to comply with the inclusion policy (e.g., previously confirmed by a human reviewer).

The selector machine learning model may be trained using an aggregated list of features scores, where such aggregated list includes, for each respective label, a list of multiple features scores, extracted from a set of training examples.

The combined probabilities (e.g., output by the match machine learning model, the in-database machine learning model, and the out-of-policy machine learning model) may be compared to a threshold error rate. In response to determining that the combined probability is lower than the threshold error rate, the database management application may determine that the new record for the local database should be created.

Lists of features scores may be created based on the newly received database record and each respective candidate record identified in the local database. The newly received database record and each respective candidate record may be input to the match machine learning model as the respective lists of features scores to calculate the respective probabilities of the new record matching the identified candidate database records, to receive the plurality of match probabilities. Based on such probabilities, a list of statistical scores (e.g., mean, maximum, minimum, standard deviation, variance as between the plurality of match probabilities) may be computed. The plurality of match probabilities may be input to the in-database machine learning model as the list of statistical scores to calculate a probability that the received database record already exists in the local database.

In some embodiments, each database record includes metadata for a media asset, where the metadata may include various metadata items related to the media asset, and each label (e.g., title, description, genre, duration, release date, etc.) is associated with respective metadata items (e.g., respective data values for the aforementioned labels) of the metadata items. The features scores of the database records may correspond to a similarity score for each respective label, as between metadata of the respective candidate database record and the received database record. The candidate database records may be identified in the database based on, e.g., a media asset having a similar title to the media asset contained in the received database record.

Prior to the generating of the list of statistical scores based on the plurality of match probabilities, the database management application may determine, based on the calculated plurality of match probabilities, whether two or more of the candidate database records match the received database record. The database management application may generate the list of statistical scores based on the plurality of match probabilities in response to determining that two or more of the candidate database records match the received database record.

In some aspects of the disclosure, a word embedding machine learning model (e.g., Word2Vec) may be employed (e.g., to determine a feature score for a description label as between database records). The word embedding machine learning model may be trained to generate respective semantic word vectors representing each word in a corpus of words, and the trained word embedding machine learning model is employed to generate respective semantic word vectors.

The new record stored in the local database, and generated based on the output from the selector machine learning model, may include a first data item associated with a first label and a second data item associated with a second label, where the first data item is selected from a different database record of the plurality of received database records than the second data item.

The features scores included in the aggregated list input to the selector machine learning model may be generated based on comparing the respective database records to predetermined rules associated with constructing database records for the local database, and/or may be generated based on comparing the plurality of database records to each other.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 7 shows an example of a training set for an in-database machine learning model, in accordance with some embodiments of this disclosure;

FIG. 8 shows an example of a training set for an out-of-policy machine learning model, in accordance with some embodiments of this disclosure;

FIG. 10 shows an example of a multiple training sets for a selector machine learning model, in accordance with some embodiments of this disclosure;

FIG. 15 shows an example of constructing an ideal candidate list of features scores, in accordance with some embodiments of this disclosure;

DETAILED DESCRIPTION

Figure 1A:
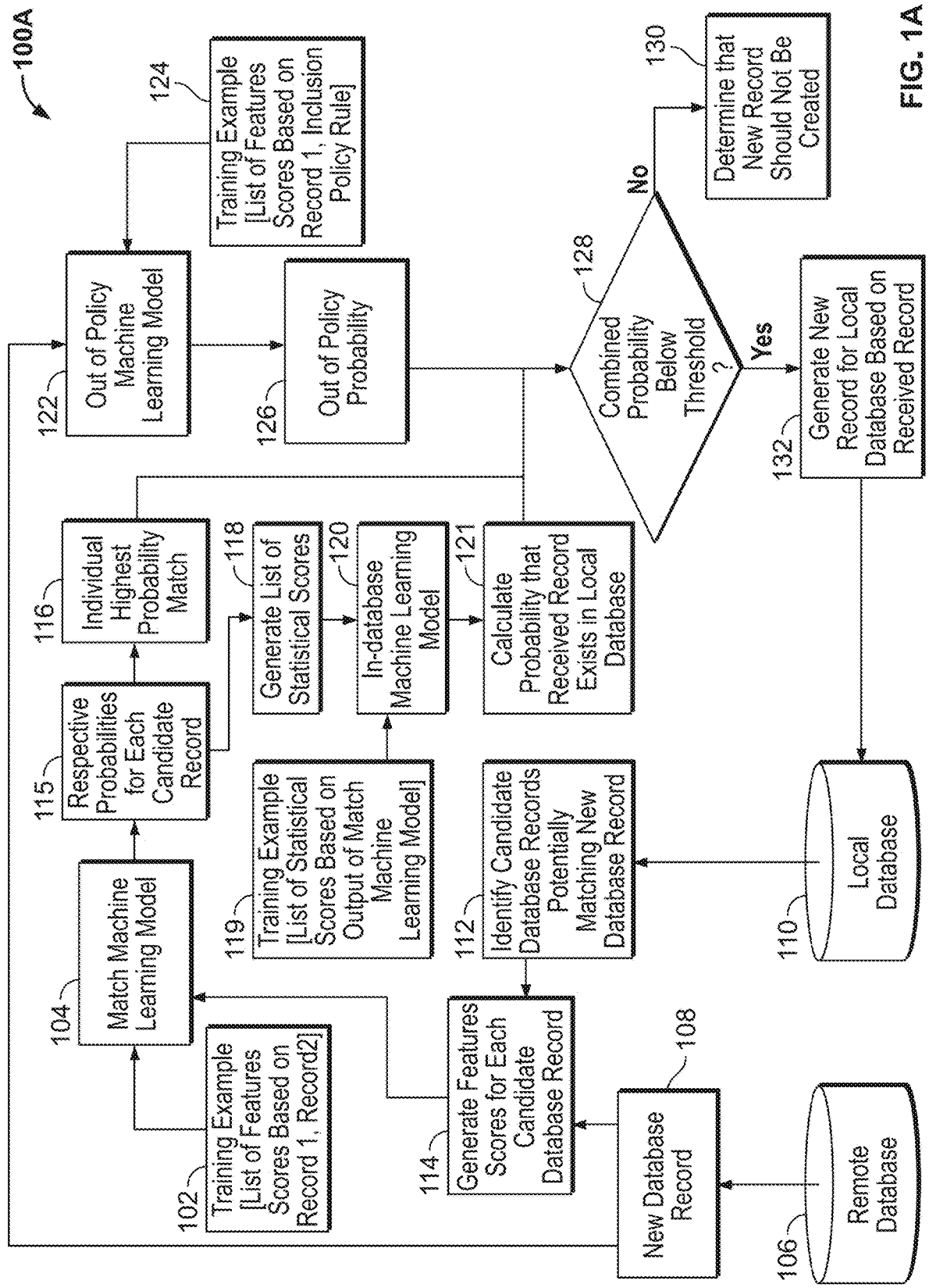
FIG. 1A shows a block diagram for generating a new database record for a local database, in accordance with some embodiments of this disclosure.

FIG. 1A shows a block diagram 100A for generating a new record for a local database after deciding whether a new record should be created based on a new database record (e.g., a record from remote database 106). For example, local database 110 may be configured to store database records (e.g., metadata items associated with media assets such as movies, television shows, sports, music, video games, etc.). Such metadata items may be displayed (e.g., via a set-top box and/or streaming device) to a user with a media asset and may include various characters (e.g., text, dates, numbers, etc.). For example, a metadata item may be displayed as part of a TV guide or over-the-top video application user interface to allow the user to select media assets to consume. In some embodiments, the database may be a different type of database, e.g., a database storing customer addresses, a database storing customer contact information, a database storing inventory, a database storing applicants for a corporation or educational instruction, etc.

A new database record 108 (e.g., containing metadata for a media asset) is received from a remote database 106 (e.g., a database associated with a media asset provider such as Netflix™, Hulu™, etc.). Before adding the new record to the database, system 100 needs to determine whether such new database record 108 refers to a media asset that is already described by a database record that already exists in local database 110 (e.g., to avoid having duplicates of the same record in local database 110) and to determine whether the new database record 108 belongs in local database 110 (e.g., is relevant to the database and complies with all database policies and/or preferences). A match machine learning model 104, an in-database machine learning model 120, and an out-of-policy machine learning model 122 are employed to assist with these predictions. Each of the machine learning models may output, along with a prediction, a predicted probability of the prediction being correct.

Match machine learning model 104 is trained based on training examples of a pair of database records 102 (e.g., previously confirmed by a human reviewer to constitute a match, or no match). Match machine learning model 104 may be a supervised machine learning model that takes as input a list of features scores (e.g., vectorized forms of data items associated with a database record) calculated based on a pair of database records and outputs a probability of the pair of database records constituting a match. For example, the features scores may include similarity scores as between metadata of a first database record and a second database record, created during a pre-processing step based on a comparison of such metadata (e.g., metadata for the media assets, such as title, episode title, cast, description, genres, duration, release year, type, language, etc.). Training of match machine learning model 104 is discussed in more detail in FIG. 5. In some embodiments, each of the database records may be in the form of vector data, a spreadsheet file created by a spreadsheet application, or other data file in which data is stored in tabular form (e.g., a database file). Any desirable number of labels (e.g., a category of metadata such as a title of a media asset) associated with corresponding metadata items may be provided (e.g., up to 80), and such labels may preferably be manually chosen or optionally machine-generated. Out-of-policy machine learning model 122 may be a supervised machine learning model trained based on training examples of a database record and inclusion policy rules of the local database (e.g., where the database record is previously confirmed by a human reviewer as either complying, or failing to comply, with such inclusion policy rules). Training of match machine learning model 104 is discussed in more detail in FIG. 5.

When the new database record 108 is received, candidate database records 112 in local database 110 are identified that potentially match the new database record 108. For example, in a case that the new database record 108 contains metadata related to a media asset, a database management application (e.g., running at least in part on a server hosting local database 110) may a search local database 110 based on a title and/or episode title of the media asset, and return the search results as the candidate database records potentially matching the received candidate record. For example, querying the database for database records having a title of "The Office" may return thousands of entries. As another example, querying the database for a media asset with an episode title including the word "wedding" may return 100 results from a variety of different media assets. It should be appreciated that various methodologies and heuristics may be employed to identify the candidate database records (e.g., a keyword or other type of search based on any of the attributes of the database record).

Candidate lists of features scores may be generated 114 (e.g., by the database management application) for each of the identified candidate database records 112. Each respective list of features scores may be generated based on the respective candidate database record and the received database record, and each feature score may be a vectorized list associated with a label (e.g., title, description, genre, duration of a media asset). Such candidate lists of features scores may range from 0-1, or any other desirable scale may be used. In some embodiments, the database management application generates a single similarity score based on the candidate lists of features scores, and such score may be used in predicting a probability that the database records match. Exemplary fields are shown in more detail at 406 in FIG. 4.

In some embodiments, the respective generated features scores 114 for each candidate in the identified candidate lists are input into match machine learning model 104, and the match machine learning model 140 outputs respective probabilities 115 for each candidate record. An individual highest match probability 116 may be output by match machine learning model 104 (e.g., to be used as part of a combined probability in making a determination whether to generate a database record). In some embodiments, if match machine learning model 104 outputs a probability indicating that only one of such candidates matches the received database record 108, the database management application may determine that the received database record 108 already exists in local database 110 (e.g., without utilizing the in-database machine learning model), and thus that a record need not be generated and stored in local database 110. Alternatively, the in-database machine learning model may be employed each time a new database record is received, regardless of the output of the match machine learning model. In some embodiments, if two or more of the respective probabilities indicate that two or more of the candidate database records match the received database record, the out-of-policy machine learning model 122 may be utilized to determine whether the database record belongs in the database. If the database management application determines that the matched database record does not belong in the database yet still matches an existing database record, the database management application may send a notification to a user to resolve such discrepancy.

Each of the respective probabilities output by the match machine learning model 104 may be used to calculate a list of statistical scores 118, to be input into the in-database machine learning model 120. It may be desirable to perform preprocessing (e.g., with the database management application) on the output of the match machine learning model to obtain the list of statistical scores 118, so that the data is in a format appropriate for input to the in-database machine learning model 120. For example, the number of candidates 112 identified in the local database 110 may be different each time a new database record is received, and such pre-processing may enable the same number of features to be input to the in-database machine learning model 120 (e.g., as a list of statistical scores calculated based on respective sets of identified candidate database records). In some embodiments, the in-database machine learning model 120 may receive the match probabilities output by the match machine learning model 104 as input and pre-process the match probabilities (e.g., to create a list of statistical scores). The in-database machine learning model 120 (e.g., a gradient-boosted decision tree), as discussed in more detail in FIG. 5, may then output a probability that the received record 108 exists in the local database 110 (e.g., even if it is uncertain which of the candidate database records is the record that matches the received record 108). The statistical scores (e.g., a mean, maximum, minimum, standard deviation, variance, weighted mean, etc.) may be computed as between the probabilities output by the match machine learning model 104. Training of the in-database machine learning model 120, based on training examples 119 (e.g., a list of statistical scores based on the output of the match machine learning model) is discussed in more detail in FIGS. 6-7.

In some embodiments, the new database record 108 is also input into out-of-policy machine learning model 122, which outputs a calculated probability 126 that the new database record 108 fails to comply with the inclusion policy rules. The inclusion policy rules may be any rules or requirements associated with local database 110 (e.g., restricting certain types of content from the database, such as video blogs or video clips from certain websites, including live streaming websites or video-sharing platforms with possible legal restrictions on the distribution of such videos). Training of the out-of-policy machine learning model 120 is discussed in more detail in FIG. 8.

The database management application may compare the combined probabilities (the individual highest probability match 116 of the candidate list of features scores, the probability the received record exists in local database 121s, and the out-of policy probability 126) to an error rate threshold 128. Various methods may be used by the database management application to combine the probabilities 116, 121, 126 (e.g., the probabilities may be multiplied, added together or otherwise combined). The combined predicted probabilities may be used to approximate the error rate obtained if the database management application makes a decision based on the predictions.

For example, the probabilities may indicate that there is a 99% probability the received database record 108 does not individually match any of the candidate database records, a 98% probability the received database record is not within local database 110, and a 96% chance that the received media asset should be included within local database 110. Stated another way, the probabilities output by the machine learning models may indicate that there is a 1% probability that the received database record matches any of the candidate database records, a 2% probability that the received database record is within the local database, and a 4% probability that the received database record fails to comply with policy rules of the local database. In such instance, the database management application may determine after combining the probabilities that there is a 93% probability that creating the asset is the correct decision (i.e., that there is a 7% probability the received record already exists in the local database and/or fails to comply with policy rules of the local database). The database management application may compare the combined probability to the error rate 128 (e.g., a human error rate, based on a running count of error in human-created records) to determine whether to generate a record for local database 110. For example, the database management application may have previously determined that the human error rate is 11%. If the 7% combined probability that creating the asset is the incorrect decision is compared to the threshold error rate, the database management application may determine that the new database record should be generated 132 for local database 110, (e.g., since the 7% probability is lower than the human error rate of 11%). On the other hand, if the approximated error rate exceeds the human error rate, the database management application may determine 130 that a new record should not be created, and/or request input from a user or database management system administrator.

Figure 1B:
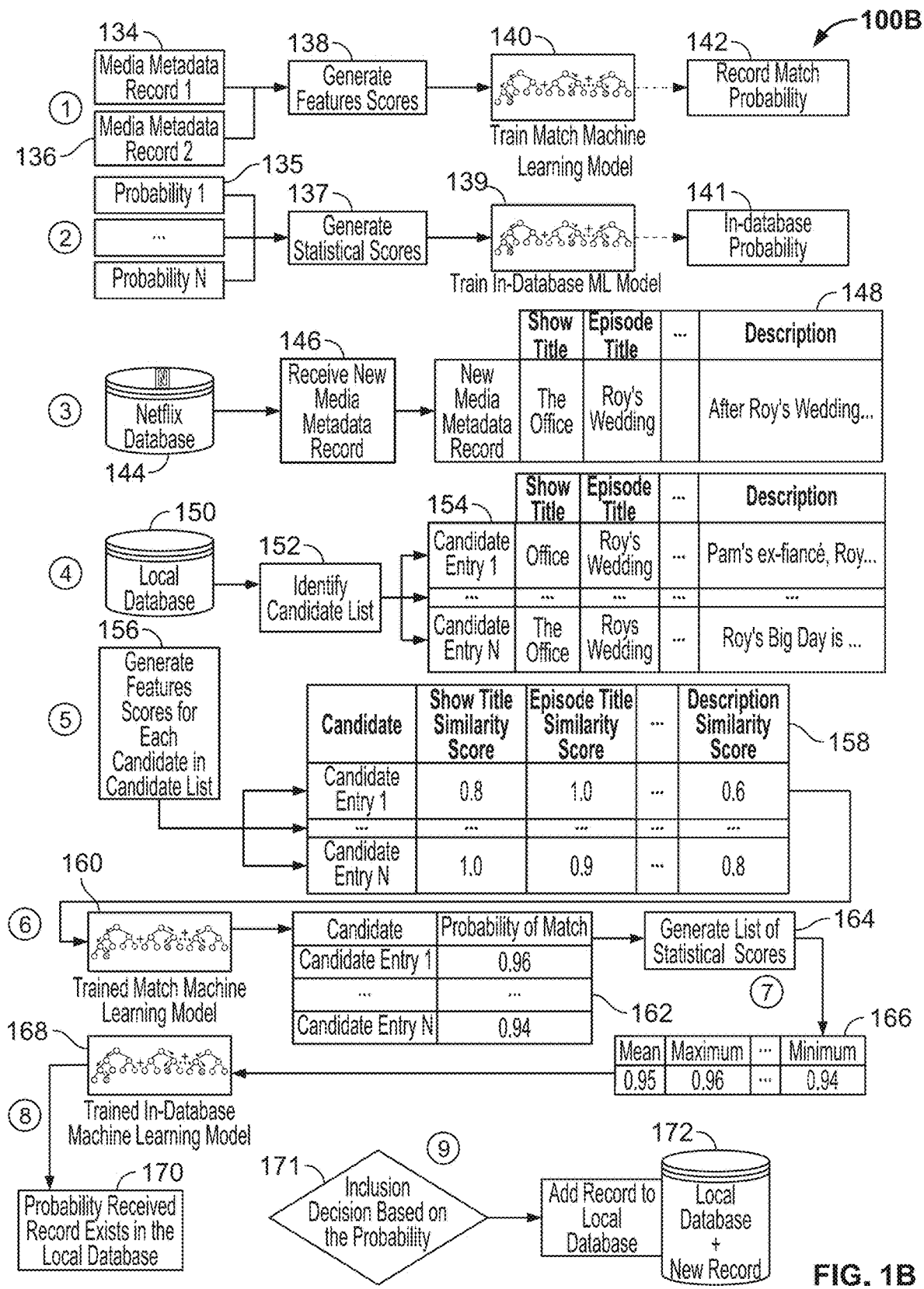
FIG. 1B shows an example of generating a new database record for a local database, in accordance with some embodiments of this disclosure.

FIG. 1B shows an example 100B of determining whether to generate a new record for a local database based on a probability received by inputting a plurality of match probabilities into the trained machine learning model. Media metadata records 134, 136 constitute a training example pair provided to train 140 the machine learning model to output a record match probability 142. For example, the records 134, 136 may be input to the match machine learning model 140 as features scores calculated based on the records 134, 136. Multiple probabilities 135 output by the match machine learning model may be used to train the in-database machine learning model 139 to output an in-database probability 141. For example, the probabilities 135 may be input to the in-database machine learning model 139 as statistical scores calculated based on the probabilities 135. A new media metadata record 146 (e.g., of S1E10 of "The Office") is received from a remote database 144 (e.g., from Netflix™'s database). The received new media metadata record 146 may include various labels 148 (e.g., show title, episode title, description, etc.) associated with the media asset.

A candidate list 152 of metadata records of candidate database records is identified in a local database 150, and a list of feature scores is generated 156 for each candidate record. The database management application feeds the generated features scores 158 into the trained match machine learning model 160 to receive, for each respective candidate database record, a respective probability of the candidate database record matching the received database record 162. Based on such output probabilities, statistical scores 166 may be generated 164 input to the trained in-database machine learning model 168, to output a probability 170 that the received record exists in the local database. A decision 171 is made to include the record received from Netflix™ into the local database 172 based on the probability 170. For example, database management application computes a combined probability, using probability 170 as part of the computation, as described in the example of FIG. 1C, in such inclusion decision.

Figure 1C:
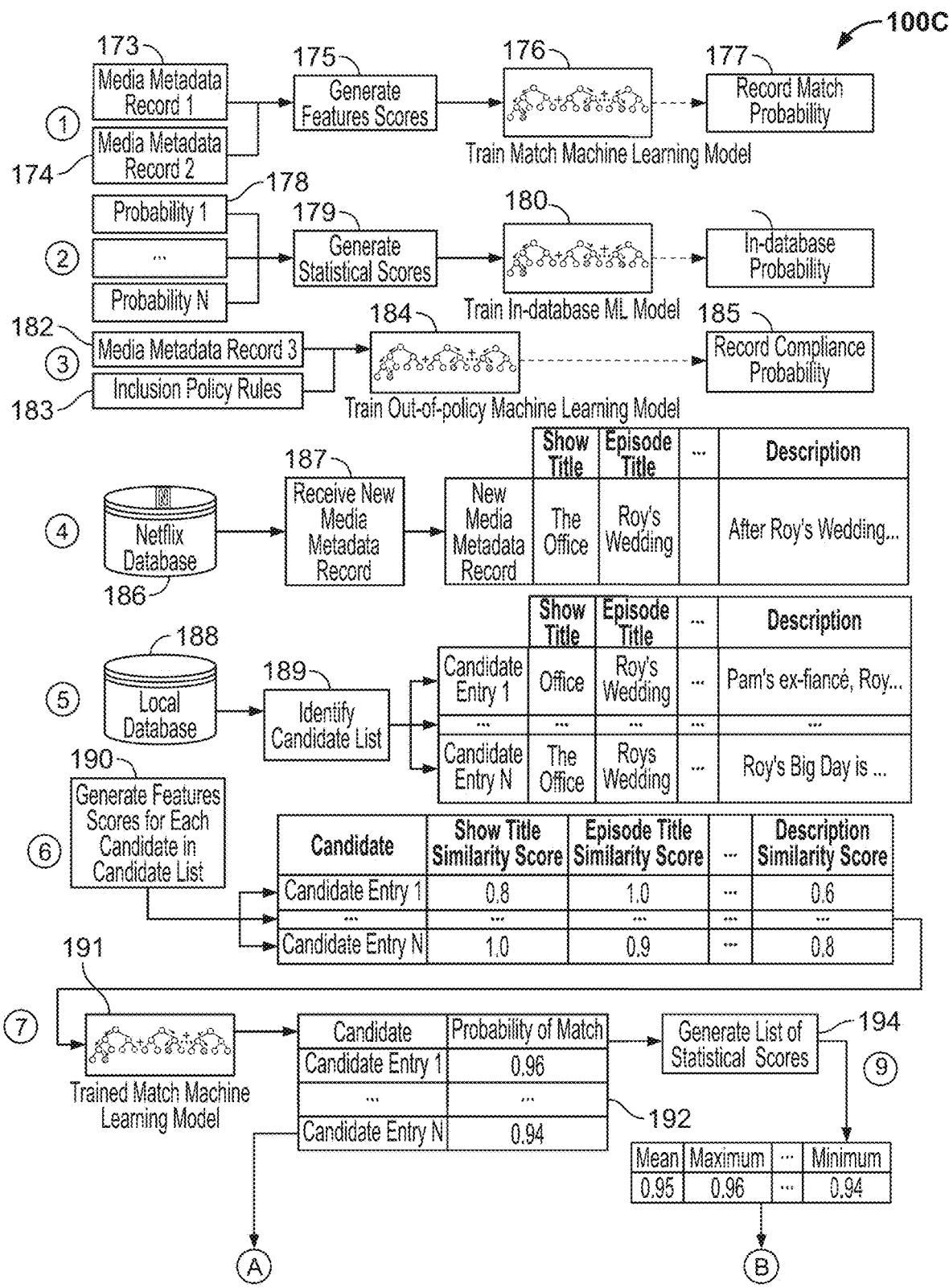
FIG. 1C shows another example of generating a new database record for a local database, in accordance with some embodiments of this disclosure.
Figure 1C:
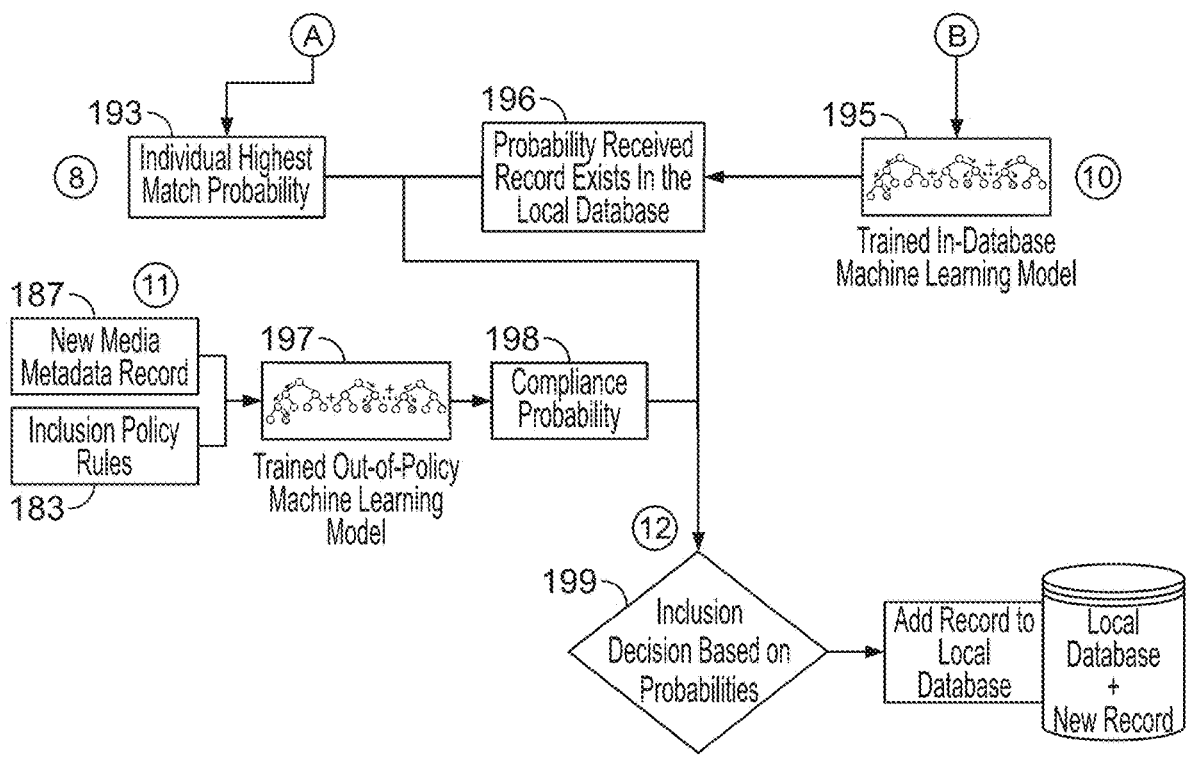

FIG. 1C shows an example 100C in which a match machine learning model is utilized together with an out-of-policy machine learning model to determine whether a new record should be created for a local database. The machine learning models may form a data pipeline to enable a series of data processing steps between the models. The match machine learning model is trained 176 to accept media metadata records 173, 174 (e.g., as generated features scores 175) and output a probability 177 the database records match. Multiple probabilities 135 output by the match machine learning model may be used to train the in-database machine learning model 139 to output an in-database probability 141. For example, the probabilities 135 may be input to the in-database machine learning model 139 as statistical scores calculated based on the probabilities 135. An out-of-policy machine learning model 184 is trained to accept media metadata record 182 and inclusion policy rules 183 (e.g., whether the record includes metadata attributes related to undesired content such as a video blog) and output a probability 185 that the record fails to comply with the inclusion rules.

A new media metadata record 187 (e.g., of S1E10 of "The Office") is received from a remote database 1861 (e.g., from Netflix™'s database), and a list of metadata records (e.g., each associated with a respective label 183) of candidate database records 189 is identified in local database 188. The candidate list 187 is fed (e.g., as a list of generated features scores, represented in vector form, etc.) into the trained match machine learning model 191 to receive the respective probabilities 192 that each candidate record matches the received record 187, and to obtain the highest probability 193 an individual candidate matches the metadata record received from Netflix™. Each of the respective match probabilities 192 may be used in generating statistical scores 194 (e.g., mean, median, maximum, minimum, standard deviation, weighted mean, variance, etc.) as between the calculated match probabilities, and the match probabilities are input (e.g., as the generated list of statistical scores) into the trained in-database machine learning model 195. Based on the input inclusion policy rules 183 and the metadata record received 187 received from Netflix™, the trained out-of-policy machine learning model 197 outputs a probability 198 the received record (e.g., from a media asset provider such as Netflix™) complies with inclusion rules. Based on the probabilities 193, 196, 198, a decision 199 is made to include the received database record into local database. The example of FIG. 1B may optionally be used in conjunction with the example of FIG. 1C (e.g., the database management application may utilize the out-of-policy machine learning model in the example of FIG. 1B).

Figure 2A:
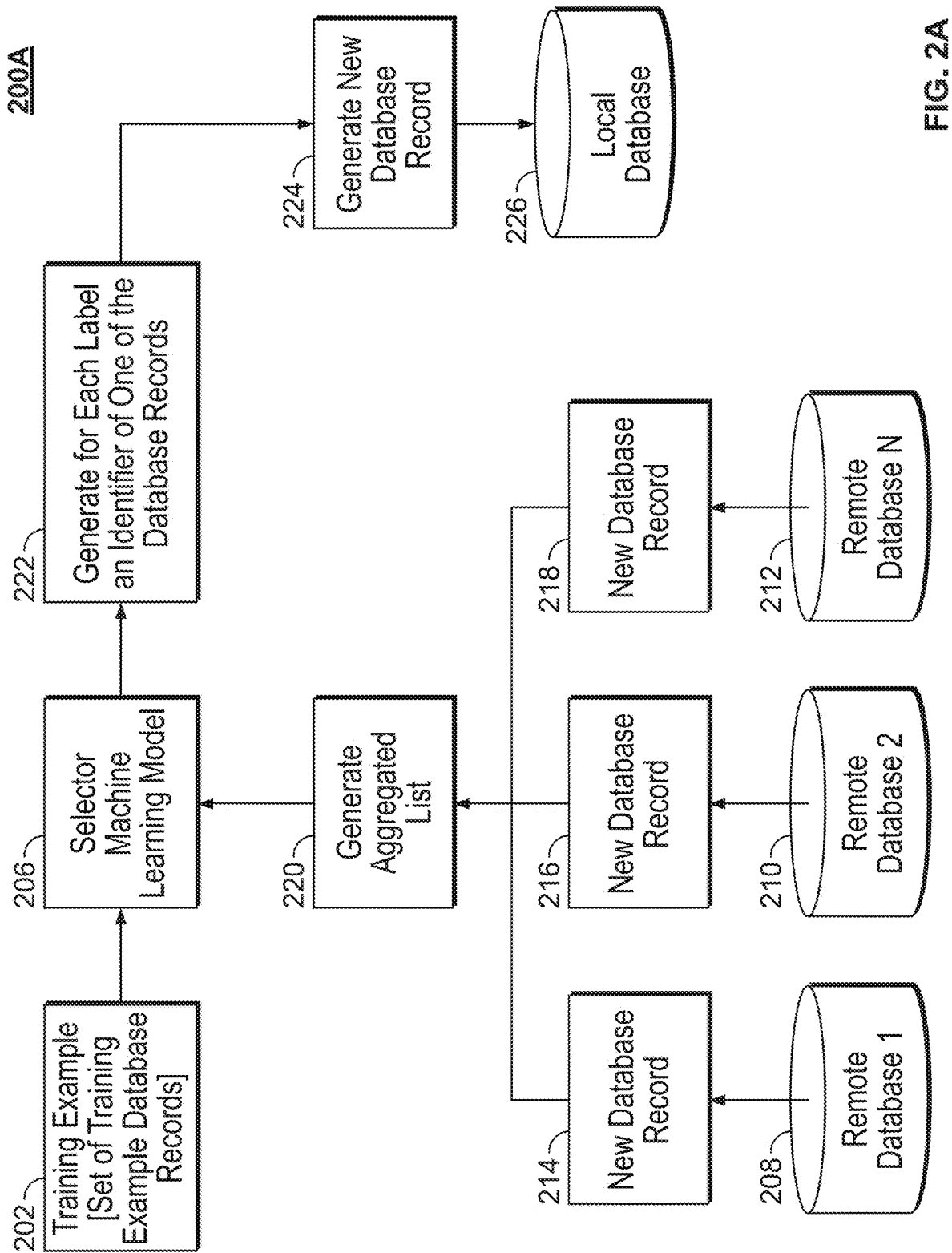
FIG. 2A shows a block diagram for generating a new database record for a local database, based on multiple received database records, in accordance with some embodiments of this disclosure.

FIG. 2A shows a block diagram 200A for generating a new database record based on multiple database records received at a local database. Local database 226 may be configured to store database records (e.g., metadata related to media assets, such as movies, television shows, sports, music, video games, etc.). The new database records 214, 216, 218 (e.g., containing metadata for a media asset) are received from remote databases 208, 210, 212 (e.g., the databases being respectively associated with a media asset provider such as Netflix™, Hulu™, Amazon™ etc.). The number of received database records is exemplary, and it may be appreciated that local database 226 may receive any number of database records. Upon receiving new database records 214, 216, 218, it is determined that a single database record should be created based on the received records. For example, the database management application may input pairs from among the received database records 214, 216, 218 into the match machine learning model, the in-database machine learning model, and/or the out-of-policy machine learning model (as discussed with reference to FIGS. 1A-1C) to calculate a probability that such received database records match (e.g., constitute metadata for a same media asset), a probability that such database records are not already present in local database 226, and/or a probability that each of the received database records 214, 216, 218 fails to comply with inclusion policy rules.

Each received database record includes labels (e.g., show title, episode title, description, etc., of a media asset) associated with data items (e.g., "The Office" as a show title). The database management application may convert (e.g., vectorize) such data items of the respective database records 214, 216, 218 into features scores, such that each database record is associated with a list of features scores. The database management application may compute the features scores based on various metrics (e.g., a comparison between the received database records and/or a comparison to requirements or preferences of the local database). For example, if the majority of the received database records have the same title (e.g., "The Office"), the database management application may generate a relatively high feature score for the "title" label for each of the database records having metadata associated with such label. As another example, compliance with rules or preferences of the local database (e.g., a maximum or minimum amount of characters permitted or required for the "title" label) may impact the features score for the associated label.

Once it is determined that a single database record should be created for the database records 214, 216, 218, the database management application generates an aggregated list 220 of the features scores. The database management application may generate the features scores for each database record prior to, or concurrent with, the generation of the aggregated list of features scores. Such aggregated list includes for each respective label (e.g., show title, episode title, description, etc., of a media asset) a respective set of features scores based on data items (e.g., "The Office" as a show title) associated with the respective label of the database records. Each set of features scores may be in the form of a vector. For example, one of the sets of features scores may correspond to the "title" label and consist of a vector represented by a list of {0.8, 0.9, 1.0} corresponding to respective features scores associated with the "title" label for the database records 214, 216, 218, respectively.

The aggregated list of features scores is input to trained selector machine learning model 206. Selector machine learning model 206 may be a supervised machine learning model trained on multiple training sets. Each training set may include a list comprising a plurality of labels, where each respective label is associated with a respective set of features scores. Each training set may be associated with a previously confirmed decision in which a feature score for each respective label was previously chosen (e.g., a particular feature score generated based on a particular received database record).

Upon receiving the generated aggregated list 220, selector machine learning model 206 generates for each label an identifier of one of the received database records 214, 216, 218, to be referenced in generating a new database record 224. For example, selector machine learning model 206 may output a vector represented by a list {3, 1, 2 . . . , 3} where each number is an identifier one of received database records 214, 216, 218. Such values may be output by the selector model 206 as being the most desirable score for each label, based on the data sets used to train selector machine learning model 206. The new database record that is generated 224 for local database 226 (e.g., by the database management application) includes data items for each respective label, as identified by the generated identifier 222. For example, if the identifier for the "title" label indicates a value of 0.8 from a particular remote database (e.g., a remote database associated with Amazon™), the corresponding data item for the "title label" is the metadata information (e.g., "The Office") associated with the database record received from such remote database (e.g., Amazon). In this way, the generated database record is associated with a data item for each label, and stored in local database 226.

Figure 2B:
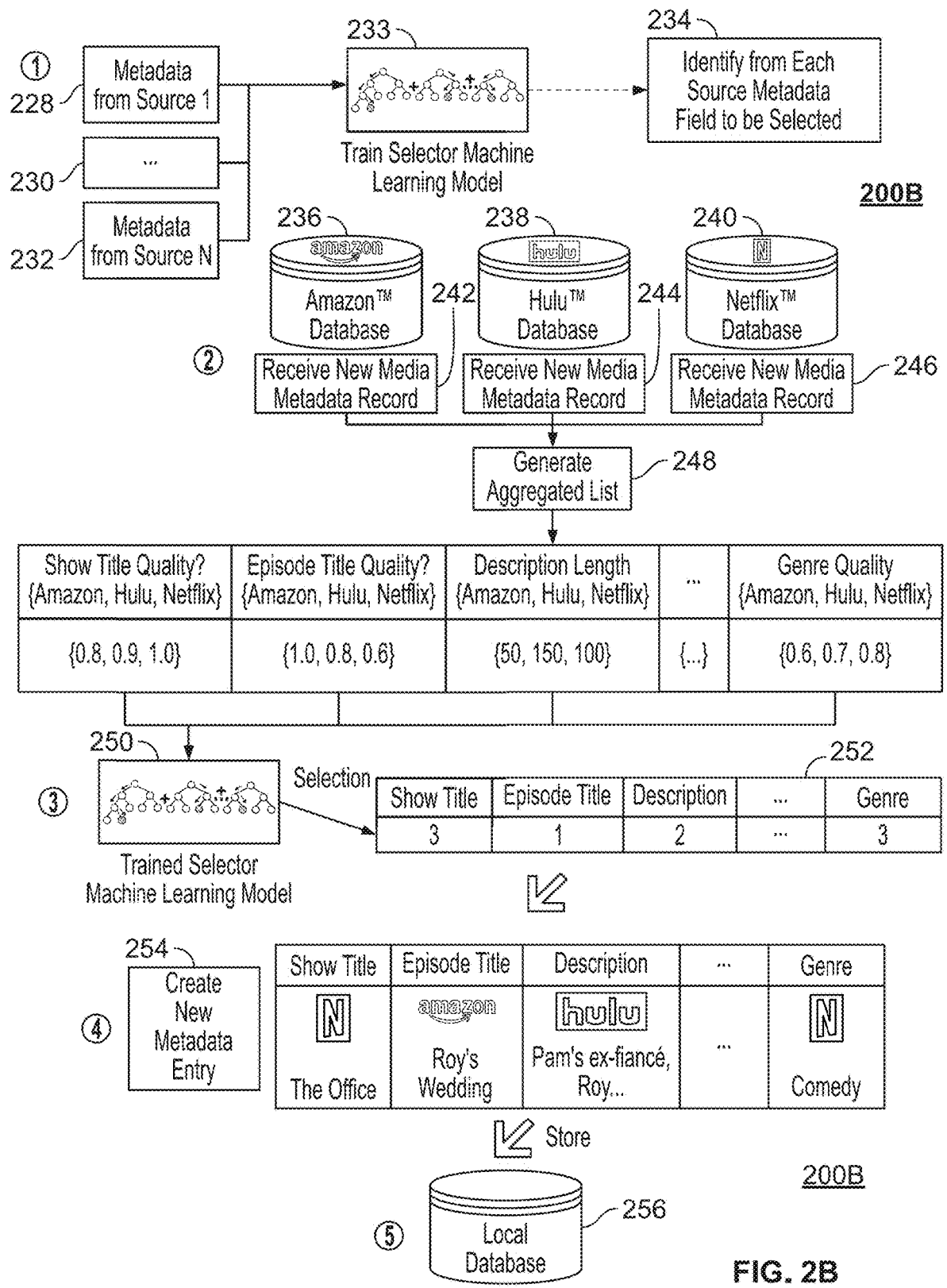
FIG. 2B shows another example of generating a new database record for a local database, based on multiple received database records, in accordance with some embodiments of this disclosure.

FIG. 2B shows an example 200B in which a database record is generated based on an aggregate list of features scores from database records received from multiple remote databases. Selector machine learning model 233 is trained to accept lists including multiple labels (e.g., show title, episode title, description, etc., for a media metadata record), where each label is associated with a respective set of features scores (e.g., similarity scores computed for a media title, episode title, description, etc.), and each label is associated with data items (e.g., "The Office" as a show title). The model outputs for each respective label an identifier 234 of a score amongst the sets of features scores for the respective label.

For example, new media metadata records 242, 244, 246 (e.g., of S1E10 of "The Office") are received from respective remote databases 236, 238, 240 (e.g., from databases respectively associated with Amazon™, Hulu™, and Netflix™), and an aggregated list of feature scores is generated for each label, e.g., in the format of scores for {Amazon™, Hulu™ Netflix™}. The aggregated list 248 is fed into the trained selector machine learning model 250 which outputs identifiers of the best score for each label 252 (e.g., show title from Netflix™ episode title from Amazon™, description from Hulu™, etc.). A new record 254 is created for local database 256 with metadata items corresponding to the identifiers output by the model. The example of FIG. 2B may optionally be used in conjunction with the examples of FIG. 1B and/or FIG. 1C, such as to determine what to create for the database record, after predicting that such database record should be created. For example, record 254 may have the Show Title from record 246, Episode Title from record 242, the Description from record 244, and the Genre from record 246.

Figure 3:
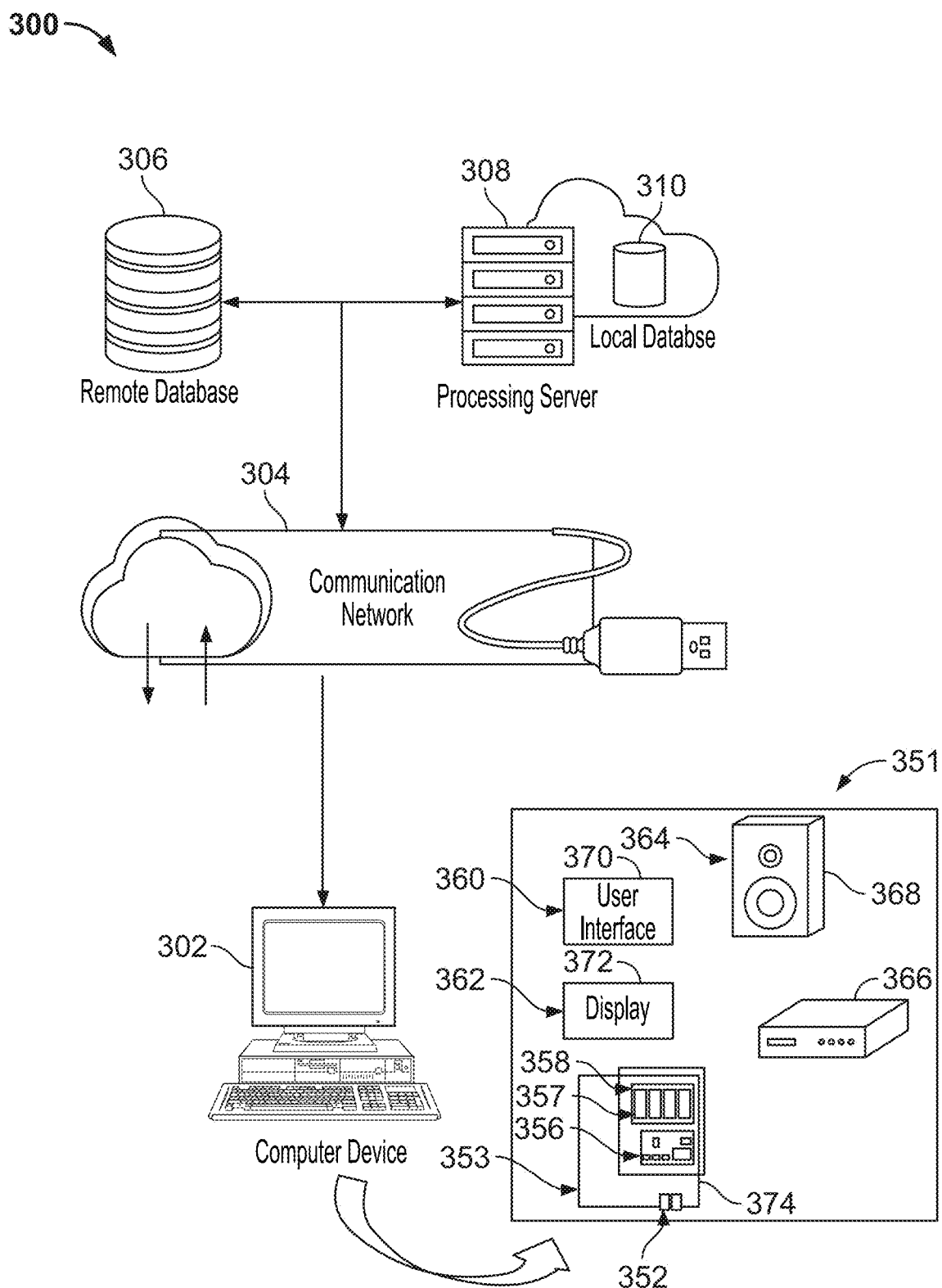
FIG. 3 is a block diagram of an illustrative database management system, in accordance with some embodiments of this disclosure.

FIG. 3 shows generalized embodiments of a system that may host the above-mentioned database management application, in accordance with some embodiments of the disclosure. In system 300, there may be multiple devices, but only one of each is shown in FIG. 3 to avoid overcomplicating the drawing. Device 302 may be coupled to communication network 304. Device 302 may be any type of a computing device, such as a server, a desktop, a tablet, a smartphone, any other computing device or any combination thereof. Communication network 304 may be one or more networks including the Internet, a mobile phone network, mobile voice or data network (e.g., a 4G or LTE network), cable network, public switched telephone network, or other types of communication network or combinations of communication networks. Remote server 306 (e.g., a server that hosts remote database 306), processing server 308 (e.g., a server that hosts local database 310), and device 302 may be connected to communication path 304 via one or more communication paths, such as a satellite path, a fiber-optic path, a cable path, a path that supports Internet communication (e.g., IPTV), free-space connections (e.g., for broadcast or other wireless signals), or any other suitable wired or wireless communication path or combination of such paths. It should be noted that while a single remote server 306 is shown, the system may include multiple remote servers (e.g., of different content providers).

Although communication paths are not drawn between device 302, remote server 306 and processing server 308, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 304.

System 300 includes remote server 306 coupled to communication network 304. There may be more than one of remote server 306, but only one is shown in FIG. 3 to avoid overcomplicating the drawing. Remote server 306 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Remote server 306 may be a server of a financial institution. As another example, remote server 306 may store media assets and/or data items (e.g., metadata) associated with such media assets, provided by a media asset provider (e.g., Netflix™, Amazon™, Hulu™) associated with remote database 306.

The database management application may be, for example, a stand-alone application implemented on one of remote server 306, processing server 308, or device 302. For example, a database management application may be implemented as software or a set of executable instructions, which may be stored in storage 358 and executed by control circuitry 353 of a device 302. In some embodiments, the database management application may include client-server applications where only a client application resides on the media device, and a server application resides on processing server 308. For example, the database management application may be implemented partially as a client application on control circuitry 353 of device 302 and partially on processing server 308 as a server application running on control circuitry of processing server 308. When executed by control circuitry of processing server 308, the database management application may instruct the control circuitry to generate the database management application output (new database record) and transmit the generated output to one of device 302 or remote server 306. The server application may instruct the control circuitry of the remote server 306 to transmit a database record to processing server 308 or to device 302. The client application may instruct control circuitry of the device 302 to access local database 310, conduct the matching operations as described above and below and transmit the matching record to remote server 306. In some embodiments, any one of remote server 306, the processing server 308, or device 302 may include the hardware and software needed to operate the machine learning models configured as described above or below.

Device 302 may include elements of a computer device 351. In some embodiments, remote server 306 and processing server 308 may also include some or all elements described in relation to device 302. As depicted, computer device 351 may be any computer system powered by processor 374. Computer device 351 may receive content and data via input/output (hereinafter "I/O") path 352. I/O path 352 may send database records and other data to control circuitry 353, which includes processing circuitry 356, display generator circuitry 357, and storage 358. Control circuitry 353 may be used to send and receive commands, requests, and other suitable data using I/O path 352. I/O path 352 may connect control circuitry 353 (and specifically processing circuitry 356) to one or more communication paths (described below). I/O functions may be provided by one or more of these communication paths, but are shown as a single path in FIG. 3 to avoid overcomplicating the drawing. I/O path 352 may comprise a wired network port circuitry, wireless network port circuitry, and/or any other circuitry suitable for device 302 to input and output signals.

Control circuitry 353 may be based on any suitable processing circuitry such as processing circuitry 356. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Processing circuitry 356 may include display generation circuitry 357 or be separate from display generation circuitry 357. Display generation circuitry 357 may include display generation functionalities that enable generations for display on displays 362 and/or 372. In some embodiments, control circuitry 353 executes instructions for a user equipment device and/or application stored in memory (i.e., storage 358). Specifically, control circuitry 353 may be instructed by a user equipment device and/or application to perform the functions discussed above and below.

Device 302 may operate in a cloud computing environment to access cloud services. In a cloud computing environment, various types of computing services for content sharing, storage or distribution (e.g., audio sharing sites or social networking sites) are provided by a collection of network-accessible computing and storage resources, referred to as "the cloud." Cloud resources may be accessed by device 302 using, for example, a web browser, a database management application, a desktop application, a mobile application, and/or any combination of the above. Device 302 may be a cloud client that relies on cloud computing for application delivery, or the media device may have some functionality without access to cloud resources. For example, some applications running on device 302 may be cloud applications, i.e., applications delivered as a service over the Internet, while other applications may be stored and run on the media device. In some embodiments, a user device may receive content from multiple cloud resources simultaneously. In some embodiments, media devices may use cloud resources for processing operations such as the processing operations performed by processing circuitry. In some embodiments, processing server 308 and remote server 306 may also be a part of cloud computing environment. For example, Device 302 may access one or both of processing server 308 and remote server 306 via a cloud service. In such client/server-based embodiments, control circuitry 353 may include communication circuitry suitable for communicating with one or both of processing server 308 and remote server 306. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths. In addition, communication circuitry may include circuitry that enables peer-to-peer communication of media devices, or communication of media devices in locations remote from each other. In some embodiments, the database management application is a client/server-based application that uses the cloud interface. Data for use by a thick or thin client implemented on computer device 351 is retrieved on demand by issuing requests to a server remote to the processing server 308 or remote server 306, respectively. For example, computer device 351 may receive inputs from the user via input interface 360 and transmit those inputs to a remote server (e.g., to one of processing server 308 and remote server 306) for processing and generating the corresponding outputs. The generated output is then transmitted to computer device 351 for presentation.

Memory may be an electronic storage device provided as storage 358 that is part of control circuitry 353. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage may be used to supplement storage 358 or instead of storage 358.

Control circuitry 353 may receive instructions from a user, or another system, using user input interface 360 of computer device 351. User input interface 360 may be any suitable user interface, such as a remote control, mouse, trackball, keypad, keyboard, touch screen, touchpad, stylus input, joystick, voice recognition interface, or other user input interfaces. Display 360 may be a touchscreen or touch-sensitive display. In such circumstances, user input interface 360 may be integrated with or combined with display 362. Display 372 may be provided as a stand-alone device or integrated with other elements of computer device 351. Speakers 368 may be provided as integrated with other elements of computer device 351. The audio component of videos and other content displayed on display 372 may be played through speakers 368. In some embodiments, the audio may be distributed to a receiver (not shown), which processes and outputs the audio via speakers 368. In some embodiments, device 351 may include input/outputs other than the user input interface such as network interface or cloud interface. In one implementation, device 351 may only include input/outputs other than the user input interface and lack any kind of direct input interface 360.

Computer device 351 may include hardware or software module 366. In some embodiments, module 366 may be used to process vectors generated based on records received from the remote server 306 to be matched with vectors generated based on records received from processing server 308.

Figure 4:
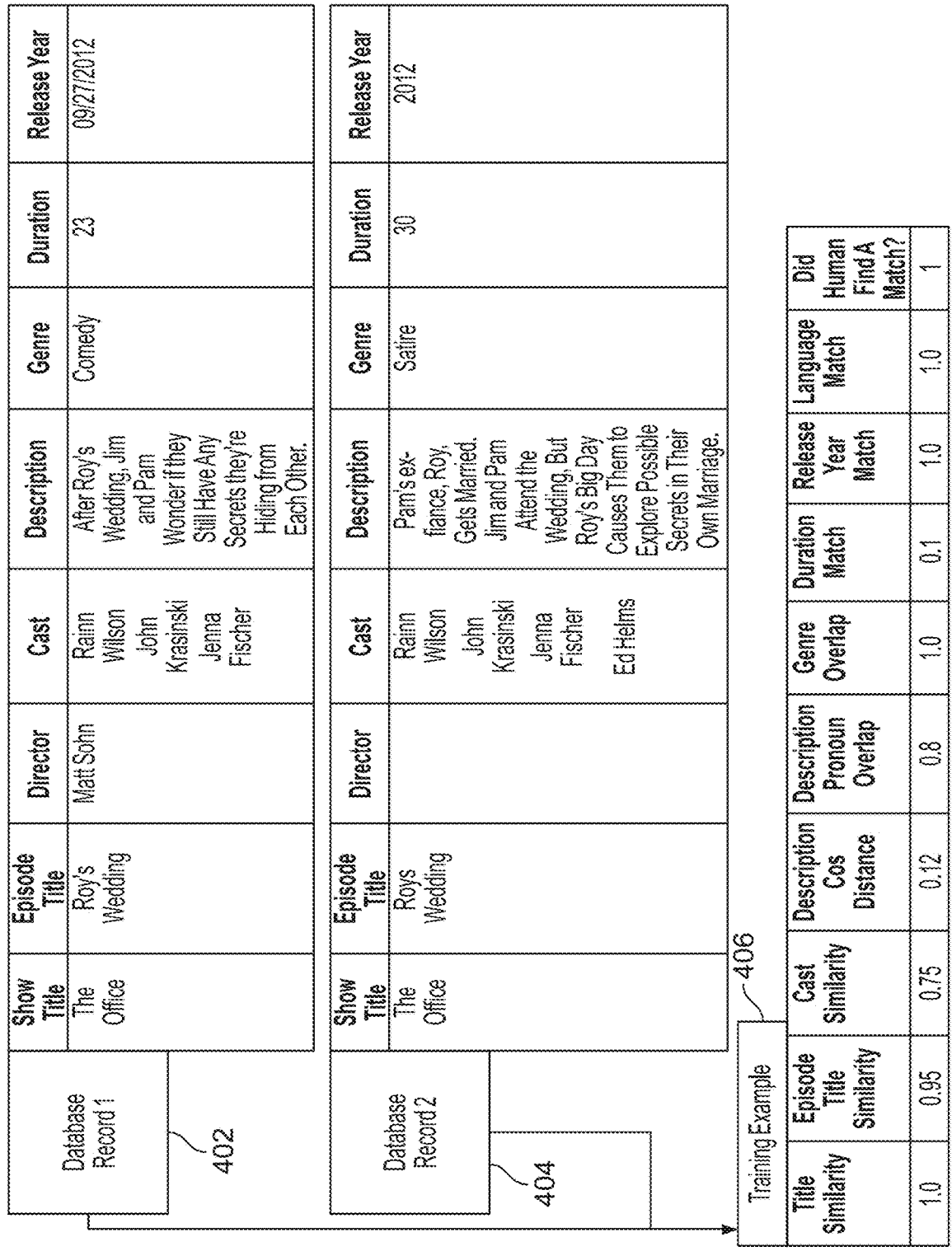
FIG. 4 shows an example of generating a list of features scores based on a pair of database records, in accordance with some embodiments of this disclosure.

FIG. 4 shows an example of pre-processing, which may be performed by the database management application on database records 402, 404 prior to inputting training example 406 to match machine learning model 104 to train such machine learning model. In some embodiments, the match machine learning model itself may receive the database records and perform such pre-processing. It should be appreciated that the example of FIG. 4 is exemplary, and the database management application may employ a large dataset including many training examples to train match machine learning model 104. Database records 402, 404 may be any combination of database records (e.g., two database records received by local database 110 from remote databases, one database record received from a remote database and one database record stored in local database 110, two database records in local database 110, etc.).

Each database record may contain various labels for a media asset, and various respective data items for each label (e.g., "The Office" for the show title label, "Roy's Wedding" for the episode title label, etc.). The labels shown in FIG. 4 are exemplary, and any desired amount of features may be used, e.g., the number of labels may be less than the labels shown in FIG. 4 or more than what is shown in FIG. 4. Additional labels may include, e.g., alternate or additional show or movie or episode titles for the media asset in one or more languages, a type of media asset, an original air data, a season number, an episode number, a program episode number, etc. The database management application may perform pre-processing on such database records to generate features scores as between the database records. For example, when determining a features score (e.g., similarity score) for the "Release Year" label, the database management application may determine an absolute value of the difference in dates (e.g., in days and/or years), take the logarithm of such absolute value, and normalize the logarithm of the absolute value. In some embodiments, if one of the labels of a database record lacks a data item value (e.g., the "Director" label of record 404 in FIG. 4), such label may be ignored in subsequent processing. Alternatively, missing or null values may be imputed (e.g., based on an average value) in subsequent processing.

A word embedding machine learning model may also be employed to determine the similarity between labels (e.g., the similarity between the descriptions of two database records). For example, each word in a text corpus may be used to train the word embedding machine learning model, in order to represent each word as a vector in a vector space. As an example, the database management application may compute an average vector for the description label by summing the vectors for each word in the description, calculated using the word embedding machine learning model, and calculating an average vector based on such summed vectors. Once the database management application obtains an average vector for the data items contained in each description field, a cosine distance (i.e., the cosine of an angle between two vectors in the vector space) as between the descriptions may then be computed by comparing the average vectors to each other, where a relatively smaller cosine distance indicates that the descriptions are similar to each other.

For example, a Word2Vec machine learning model may be employed as the word embedding machine learning model. Such Word2Vec model may contain plural models, one of which may be an unsupervised deep learning machine learning model used to generate vector representations (e.g., word embeddings) of words in a corpus of text used to train the model. Such generated vectors are indicative of contextual and semantic similarity between the words in the corpus. In training the Word2Vec model, a neural network may be employed with a single hidden layer, where the weights of the hidden layer correspond to the word vectors being learned. Word2Vec may utilize the architectures of a Continuous-Bag of Words model or a Continuous Skip-gram model to generate the word embeddings, as discussed in Mikolov et al., Efficient Estimation of Word Representations in Vector Space, ICLR Workshop, 2013, which is hereby incorporated by reference herein in its entirety.

As another example, as a method of computing features scores, the database management application may determine a level of pronoun overlap as between data items for a respective label, as a factor in computing a similarity score. For example, the database management application compares strings of text contained in a data item to a list of pronouns (e.g., stored in the local database) to determine a number of pronouns contained within the data item. If the database management application determines that two data items contain the same or a similar number of pronouns, the database management application may determine that the data items likely correspond to each other. Such determination may impact the similarity score generated by the database management application as between such data items.

In a manual process (e.g., performed by a human reviewer), an online tool may be utilized to manually label the database records 402, 404 as a match or not a match (e.g., "1" for match, "0" if not a match), and the training example 406, which includes each of the computed features scores and the label added manually, is input into match machine learning model 104 to train the model. One skilled in the art would appreciate that any other suitable metric may be used to train the model.

Figure 5:
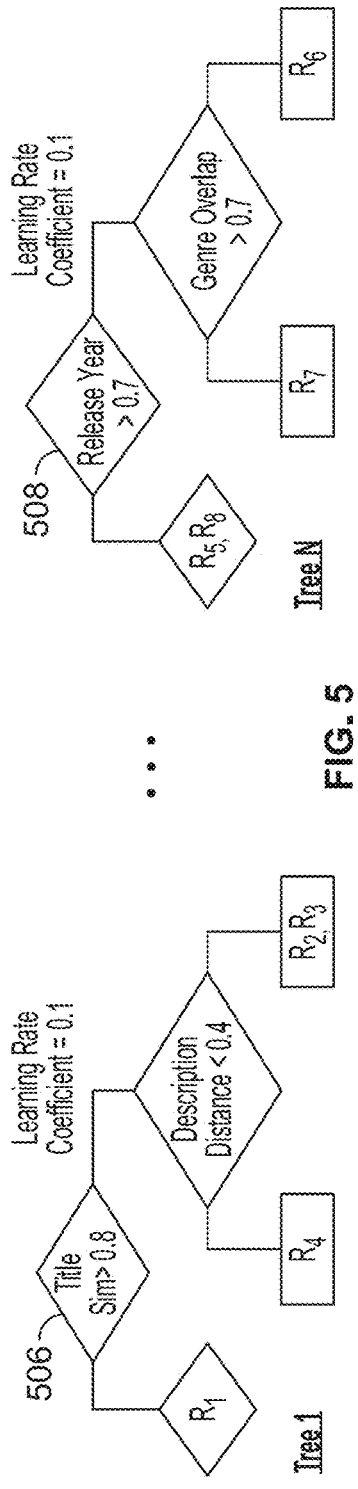
FIG. 5 shows an example of a training set for a match machine learning model and an example of a process of training the model, in accordance with some embodiments of this disclosure.

FIG. 5 shows a training set 502 with multiple training examples, and the database management application may create such training set 502 of features scores as illustrated in FIG. 4. Such training set 502 is used to build the match machine learning model. For example, the match machine learning model may be a gradient boosted decision tree for classification, although one of skill in the relevant art will appreciate that other machine learning models may be used (e.g., other boosting techniques, logistic regression, artificial neural networks, nearest neighbors, support vector machine, etc.). Such model may learn and make decisions driven by data, without being explicitly programmed. In the gradient boosted decision tree for classification, an output value for one new weak learner (e.g., decision tree) may be added one at a time to the existing decision trees (e.g., stagewise additive modeling), to minimize loss of the model. In the example of FIG. 5, decision trees 506, 508 are shown as weak learners in the gradient boosting model, although many more decision trees may be used in the training process (e.g., potentially thousands of decision trees, where each tree contributes a particular weight of the predicted value). In addition, a commonly used value of 0.1 is used for the learning rate (e.g., a parameter used to minimize loss of the model) is selected in the example of FIG. 5, although other values for the learning rate coefficient are possible. Various constraints may be set for the decision tress (e.g., maximum number of leaf nodes, number of trees to be constructed, etc.). A leaf node may be a node in the decision tree in which arrows point to the leaf node, but no additional arrows point away from such node.

As shown in FIG. 5, control circuitry (e.g., control circuitry 353 in FIG. 3, and/or control circuitry of the processing server 308) may construct a decision tree 506 using a first parameter (e.g., Title Similarity >0.8) and a second parameter (e.g., Description Distance <0.4) for the training data. In constructing the model, the control circuitry makes an initial prediction, and such initial prediction may be based on a logarithm of the odds computed for an initial leaf based on the training data, e.g., log(2 match decisions in the training set divided by 2 no match decisions in the training set)=0. Based on such log(odds) value, the control circuitry utilizes a logistic function to obtain a probability (e.g., 0.5 as an initial prediction). Based on such initial prediction, residual values are computed for each training example, where the Residual value=(Observed Probability−initial prediction). For example, residual value $R_1$ for the first training example in table 504 is 0.5 (e.g., 1-0.5, where 1 represents that a match was observed in the labeling of the training example, and 0.5 is the initial prediction).

Residual values $R_1$, $R_2$, $R_3$, $R_4$ are calculated for each training example, and the decision tree 506 is built based on the labels of the training example. For example, the first training example has a title similarity greater than 0.8, and thus the residual value $R_1$ for such training example is assigned to the leaf in the decision tree 506 reflecting such feature, and each of the residuals are similarly assigned to leaves corresponding to the features scores of the respective training examples. Output values for each of the leaves in the tree 506 may then be calculated (e.g., using the following formula: $(\Sigma \text{Residual}_i)/\Sigma(\text{Previous Probability}_i)\times(1-\text{Previous Probability}_i)$. For example, an output value of 2 is calculated for the leaf containing residual $R_1$ in the example of FIG. 5.

To obtain a new prediction for the model, the initial leaf is combined with the decision tree. For example, the initial logarithm of the odds (e.g., 0) is added to a learning rate coefficient (e.g., 0.1) which is used to scale the output value of the tree, which for the first training example yields a value of 0.2. Such value is input to the logistic function to obtain a predicted probability, which in this case is 0.55, and the predicted probabilities for the remaining training examples are computed, as shown in FIG. 5.

After obtaining the predicted probabilities based on the first tree, the control circuitry may sequentially construct a series of other decision trees including decision tree 508 (e.g., based similar or different parameters, such as based on a release year parameter and genre overlap parameter, in this example). The above-described process may then be repeated in order to obtain residual values for the decision tree 508, and the output values for each leaf in the decision tree 508 are computed and added in combination with the output values of the first tree to obtain a new predicted value (e.g., 0.57 for the first training example). Such process may be repeated by the control circuitry in an iterative process until the parameter of the maximum number of trees to be constructed is met and/or the residuals become desirably small (e.g., until the model stabilizes). In some embodiments, the model utilizes trees having between 8 and 32 leaves, and a probability of 0.5 may be a threshold for determining that a training example constitutes a match. Once the model is trained, the model may be used as, for example, match machine learning model 104, as described in FIG. 1A, for example. Various parameters or hyperparameters (e.g., a value set before the training process begins, such as number of nodes) may be utilized to evaluate and tune the model. For example, early stopping may be used to update decision trees to be a better fit with training data, and model validation techniques such as cross-validation may be used to test the model's predictions on new database records, which were not used to train the model.

Figure 6:
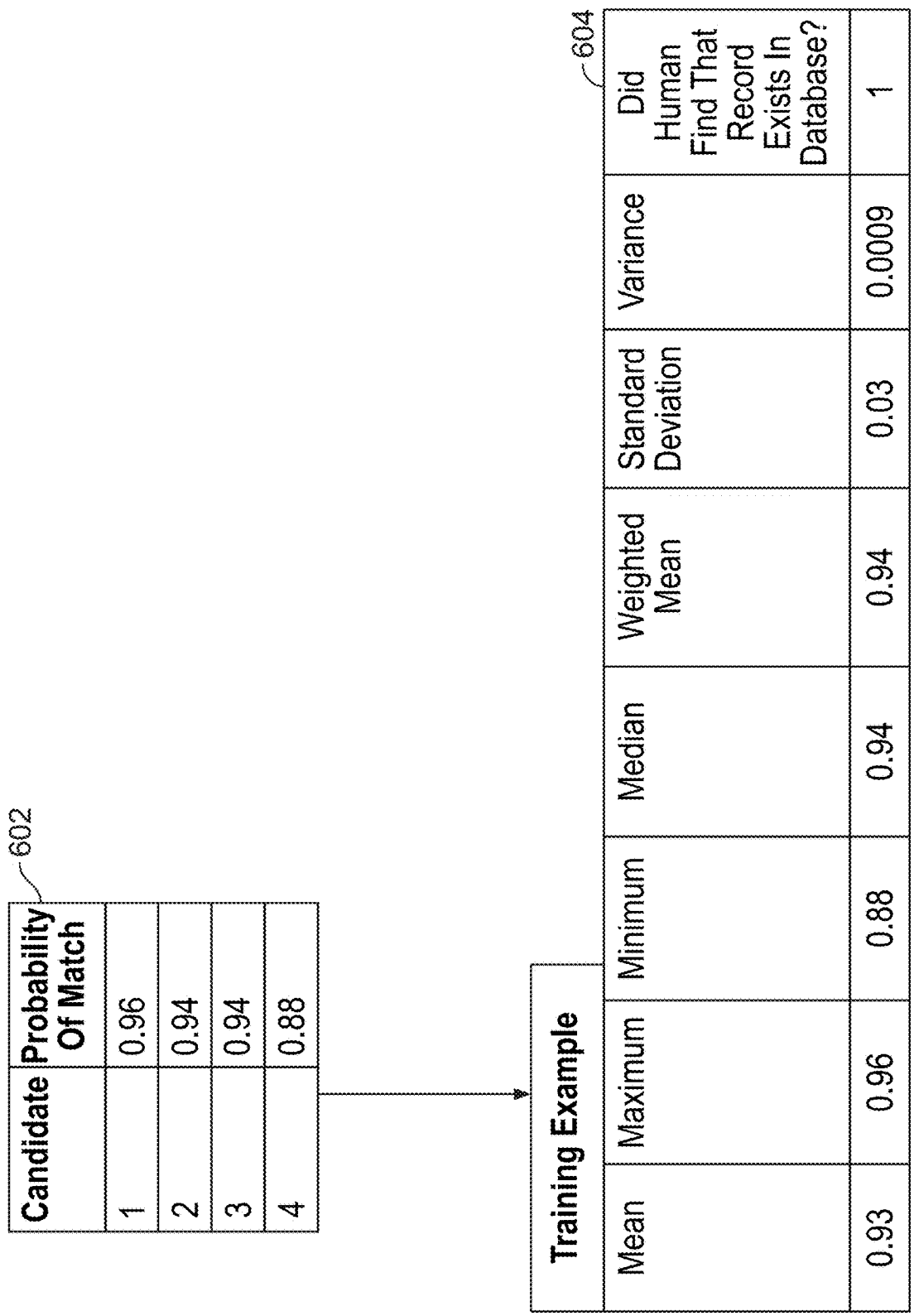
FIG. 6 shows an example of generating a list of statistical scores based on the output of the match machine learning model, in accordance with some embodiments of this disclosure.

FIG. 6 shows an example used to train an in-database model machine learning model (e.g., model 120 in FIG. 1A). The in-database machine learning model may detect various patterns based on the training data. Once respective probabilities of a received database record matching candidate database records identified in the local database are obtained from a match machine learning model (e.g., machine learning model 104 in FIG. 1A), the database management application may pre-process such list of probabilities 602 by computing a list of statistical scores 604 based on the probabilities. In some embodiments, the pre-processing may be performed by the in-database machine learning model itself (e.g., to receive the match probabilities as input, even if there is varying amount of probabilities for each received database record). It should be noted that the number of candidates in FIG. 6 is exemplary, although the number of columns in table of statistical scores 604 is preferably fixed (e.g., so that the in-database machine learning model can receive a uniform list of statistical scores when computing an output for each received database record).

The statistical scores may include, for example, a mean, maximum, minimum, medium, weighted mean, standard deviation, variance, etc. One of skill in the art would appreciate that the database management application may employ various additional or alternative statistical characteristics in the pre-processing, and/or other pre-processing methodologies. As an example, the weighted mean statistical score may allow the probability of one of the candidates to have an outsize impact relative to the other probabilities (e.g., if one of the probabilities is deemed to be more important than other probabilities in the list). In some embodiments, the database management application may utilize a subset of the list of match probabilities in generating the list of statistical scores (e.g., if one of the probabilities corresponds to a candidate database record that is an outlier, or is determined to be completely unrelated to the received database record It may be desirable to compute the list of statistical scores 604 to train the in-database model, rather than the probabilities themselves, in order to normalize the set of match probabilities. For example, each training example may include varying numbers of match probabilities, based on the number of identified candidate database records input to the match machine learning model along with a particularly newly received record. In some embodiments, the statistical scores used to train the in-database machine learning model are computed after a reviewer determines whether a received record exists in the database (e.g., matches one of the particular candidates). For example, the statistical scores need not have been consulted by a reviewer prior to making a decision, but instead may be computed after the fact for the set of the match probabilities and may be used to train the model along with the human reviewer decision.

FIG. 7 shows an example of a training set used to train the in-database model machine learning model. In this example, three lists of statistical scores 702 are shown, although it can be appreciated that many more lists of statistical scores may be included in training sets to optimize the model. Each list of statistical scores may be based on a varying number of match probabilities. For example, the following sets of match probabilities (e.g., calculated by the match machine learning model) can be used as the respective lists shown in FIG. 7: {0.88, 0.93, 0.95, 0.95}; {0.86, 0.88, 0.90}; {0.94, 0.94, 0.94}. The database management application may be configured to compute each of the statistical scores shown in the table of FIG. 7. The in-database machine learning model may be a gradient boosted decision tree (e.g., as described in FIG. 5), although one of skill in the relevant art will appreciate that other machine learning models may be used (e.g., other boosting techniques, logistic regression, artificial neural networks, nearest neighbors, support vector machine, etc.).

FIG. 8 shows an example of a training set 802 for the out-of-policy machine learning model. The training set 802 may include various labels (e.g., show title, episode title, director, cast, description, genre, duration, release year, etc.) and a manual process may be utilized where a human reviewer, for example, indicates whether the training example matches inclusion policy rules of local database 110. For example, the inclusion policy rules may include a rule that a video blog should not be included as a media asset for the database. Since the third training example in FIG. 8 indicates that the piece of content associated with the training example is a video blog, the manual entry entered for such training example indicates that a human found that such training example fails to comply with inclusion policy rules. On the other hand, training examples 1 and 2 in FIG. 8 were not determined by the human reviewer to be failing to comply with the inclusion policy rules, since, for example, training examples 1 and 2 pertained to a permissible media asset, rather than a video blog or other undesirable content. The number of training examples in FIG. 8 is exemplary, and many more training examples may be included. Such data items of the out-of-policy machine learning model may be pre-processed (e.g., by the database management application) prior to input into the model (e.g., to a list of features scores). The out-of-policy machine learning model may utilize a gradient boost decision tree model, as discussed with reference to FIG. 5, and may generate features scores or statistical scores for each of the training examples to train the model.

Figure 9:
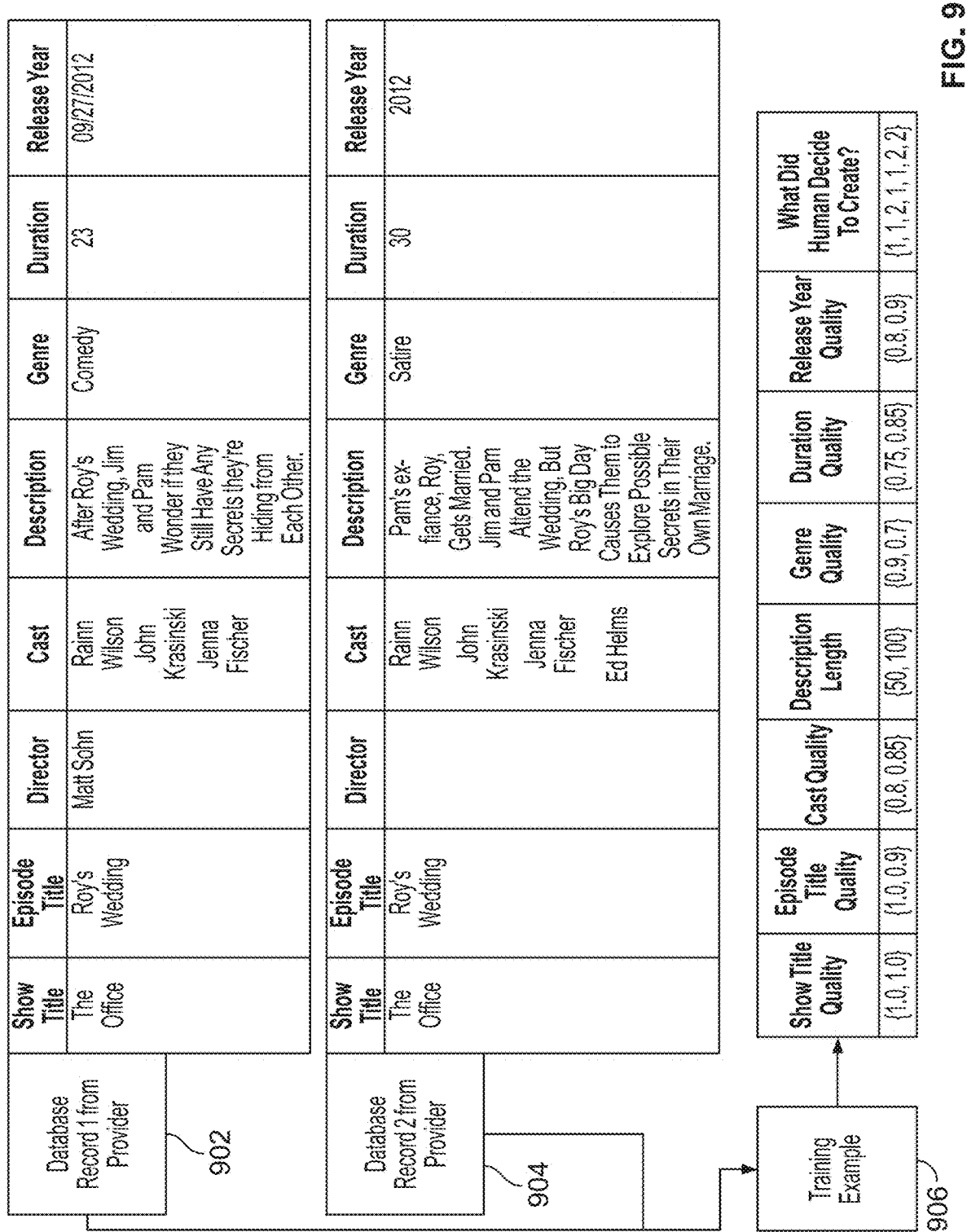
FIG. 9 shows an example of generating a list of labels associated with respective sets of features scores, in accordance with some embodiments of this disclosure.

FIG. 9 shows an example of a training example for a selector machine learning model (e.g., of model 206 of FIG. 2). FIG. 9 shows two database records being received from providers as an example, although it may be appreciated that any amount of received database records may be received and used in a training example. The database management application may generate features scores for the database records 902, 904 (e.g., received from respective providers), using methods as discussed with reference to FIG. 4, and/or based on comparing the received database records to each other or comparing the received database records to certain preferences or rules of local database 226. For example, if the database management application determines that a majority of received database records have the same media asset title, the database management application may generate relatively higher features scores for the title for each of such database records. As another example, the database management application may compare data items in the received database records to data items in local database 226 to determine certain statistics, word lengths or whether such data items align with previous data items for corresponding labels in the database (e.g., if one of the media asset descriptions of a received database record exceeds a predetermined number of characters, set based on existing records, the description may be associated with a low feature score). The database management application may also determine various metrics, such as a reading level associated with a description, and such reading level may impact a feature score for the description (e.g., a certain reading level may be desirable to appeal to the largest amount of consumers, and descriptions corresponding to a certain reading level may commonly have been chosen in past training examples).

The database management application may generate training example 906 as a vector represented by a list of features scores for each received database record. Such features scores, along with a list of features scores that a human decided to create when faced with a decision as to which data items to include in a new database record based on the received database records, are used to train selector machine learning model 206. For example, in training example 906, the reviewer may have decided to include, from amongst the features scores of database records 902 and 804, the features scores of record 902 for the "Show Title Quality" score; the feature score of record 902 for the "Episode Title Quality" score; omit a score for the director label as only one of the database records included such data item; the feature score of record 804 for the "Cast Quality" score; the feature score of record 902 for the "Description Length"; the feature score of record 902 for the "Genre Quality" score; the feature score of record 804 for the "Duration Quality" score; and the feature score of record 804 for the "Release Year Quality" score.

FIG. 10 shows an example of a training set 1002 for selector machine learning model 206. With such dataset 1002, the database management application trains the selector machine learning model, which may be, e.g., a gradient boost decision tree model, an artificial neural network, etc. As shown in FIG. 10, each of the training examples includes, for each label, a list of features scores generated based on the data items associated with each label for each respective received database record. Each training example includes identifiers, as selected by a human reviewer using, e.g., an online tool, indicative of which data item is selected for each label, from amongst the data items received in the multiple received database records. As can be appreciated by one of skill in the relevant art, any number of labels may be included in the list of features scores, and each training example may contain various amounts of received database records.

Figure 11:
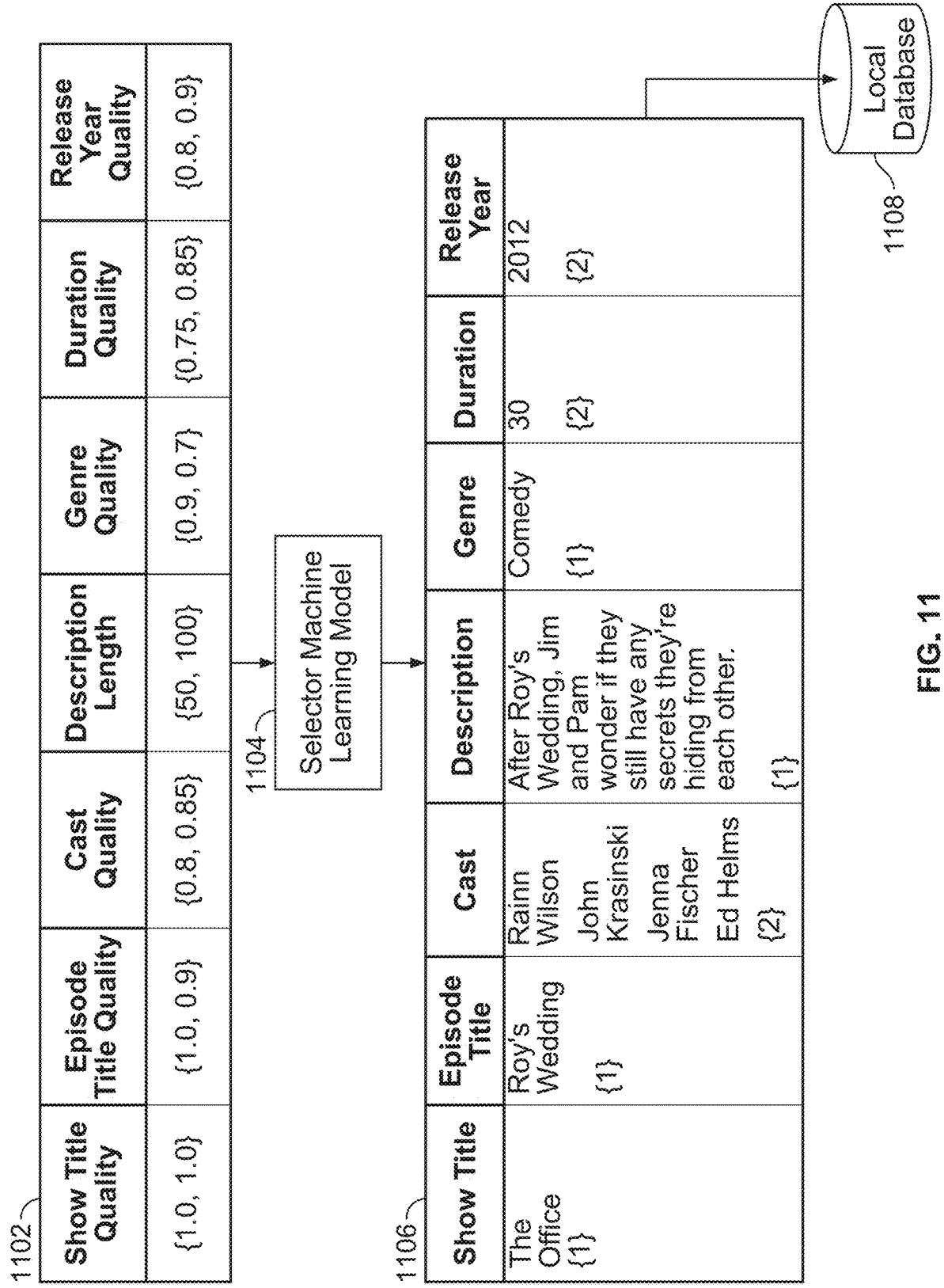
FIG. 11 shows a block diagram of generating a new database record using a selector machine learning model, in accordance with some embodiments of this disclosure.

FIG. 11 shows an example of generating a new record for local database 1108 based on received database records. The database management application may generate a vector represented by a list for each of the labels 1102 for the received database records, and input to selector machine learning model 1104. Selector machine learning model 1104 outputs selections 1106 including respective identifiers for each label. For example, for the label "Cast" the identifier {2} corresponds to the cast for the second received database record, and thus the cast "Rainn Wilson; John Krasinski; Jenna Fischer; Ed Helms" is included in the new record to be generated and stored in local database 1108. Such output is represented as a list of vector position, e.g., where {1} represents a first database record and {2} represents a second database record. Although the example of FIG. 11 shows an identifier of a database with a highest feature score being selected for many of the labels, this is not necessarily the case. For example, the selector machine learning model 1104 may recognize certain patterns in the data sets used to train the model to identify instances where a top score would not be used (e.g., if a large amount of features scores in the list of features scores for a particular label correspond to a single feature score). Further, selector machine learning model 1104 may recognize that, based on past data patterns used to train the model, a certain pairing of selections is desirable (e.g., a movie should have a longer description than an episode title).

As in the example of FIG. 11, the database management application may perform the aggregating based on a maximum value for each label, although the database management application may additionally or alternatively employ other methodologies in the aggregating (e.g., based on Minimum, Mean, Mode, Median, Weighted Mean, etc.). In addition, the database management application may perform aggregation differently for different features (e.g., one feature may be aggregated based on max, another feature may be aggregated based on minimum, etc.).

Figure 12:
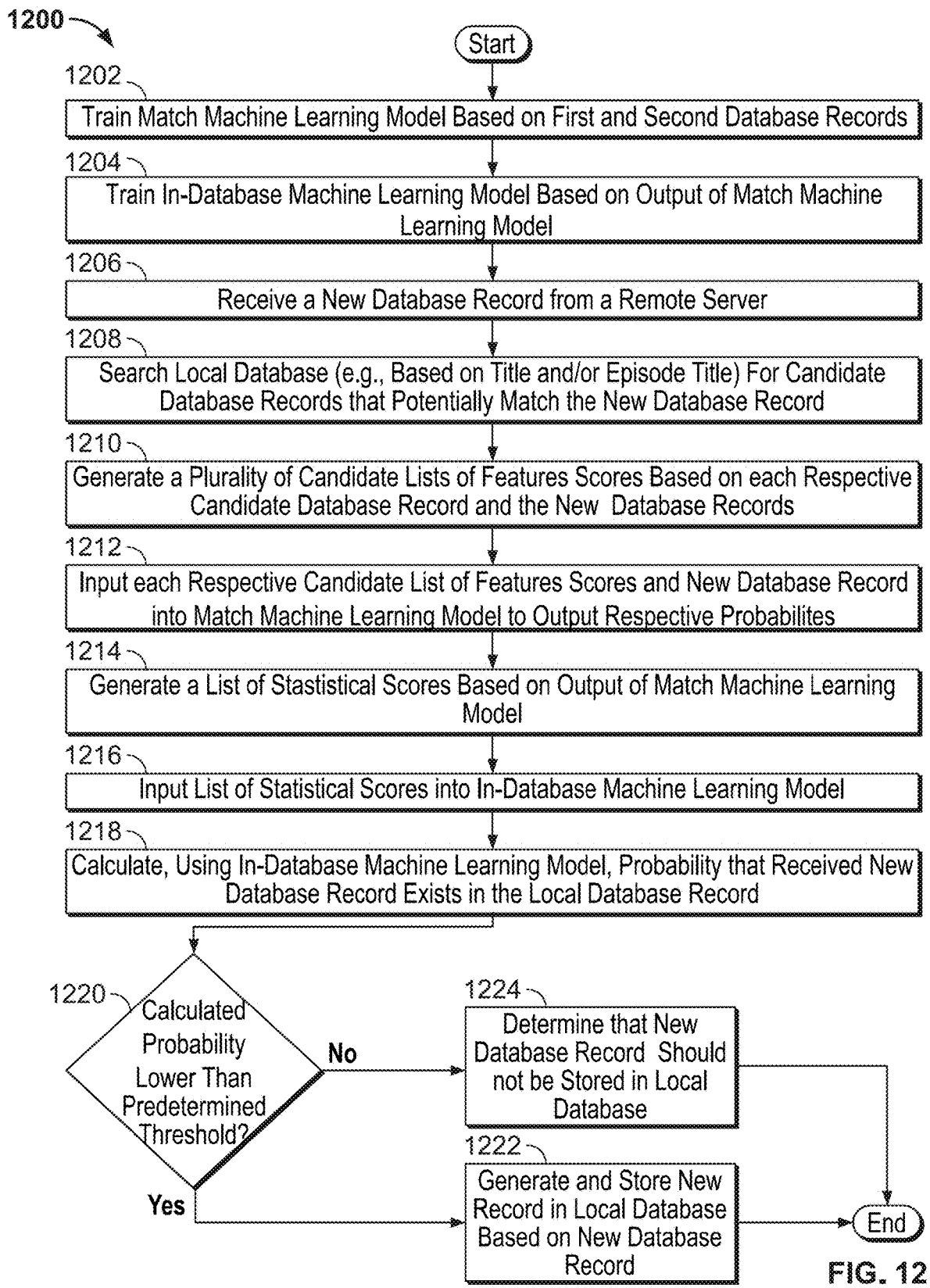
FIG. 12 is a flowchart of a detailed illustrative process for determining whether to generate a new database record based on a received database record, in accordance with some embodiments of this disclosure.

FIG. 12 is a flowchart of an illustrative process for generating a new database record based on a received database record, in accordance with some embodiments of the disclosure. It should be noted that process 1200 or any step thereof could be performed on, or provided by, any of the devices shown in FIG. 3. For example, process 1200 may be executed by computer device 351 (e.g., via control circuitry 353) and/or control circuitry of the processing server 308, as instructed by a database management application that may be implemented on computer device 351, and/or processing server 308 and/or remote server 306, such as to distribute control of database management application operations for a target device among multiple devices. In addition, one or more steps of process 1200 may be incorporated into or combined with one or more steps of any other process or embodiment (e.g., process 1300 of FIG. 13, process 1400 of FIG. 14).

Process 1200 begins at block 1202, where control circuitry (e.g., control circuitry of the processing server 308, or control circuitry 353, of FIG. 3) trains a match machine learning model (e.g., model 104 in FIG. 1A), e.g., based on first and second database records, such as with features scores generated by the database management application as between such database records (e.g., training set 502 in FIG. 5). In some embodiments, the training data set includes training examples labeled as a match or not a match (e.g., previously confirmed by a human reviewer). In some embodiments, the match machine learning model may be trained in advance by other systems, and subsequently shared with the control circuitry.

At 1204, the control circuitry trains an in-database machine learning model (e.g., model 120 in FIG. 1A) e.g., based on match probabilities output by the match machine learning model, which may be input to the in-database machine learning model as computed statistical scores (e.g., scores 702 in FIG. 7). In some embodiments, the in-database machine learning model may be trained in advance by other systems, and subsequently shared with the control circuitry.

At 1206, the control circuitry receives a new database record (e.g., database record 108 of FIG. 1A) from a remote database (e.g., remote database 106 of FIG. 1A) via I/O circuitry (e.g., via I/O path 352 of FIG. 3, and/or via I/O circuitry of processing server 308 of FIG. 3). The new database record may be metadata for a media asset, and the remote database may be associated with a media asset provider (e.g., Netflix™, Amazon™, Hulu™, etc.).

At 1208, control circuitry of the processing server 308 may search the local database (e.g., local database 110 of FIG. 1A) for candidate database records that potentially match the received database record. For example, such search may be for database records in the local database having metadata for a "title" or "episode title" label matching that of the received database record.

At 1210, control circuitry of the processing server 308 (or the match machine learning model itself) may generate candidate lists of features scores (e.g., candidate lists of features scores 158 in FIG. 1B) based on the respective candidate records obtained from the local database and the received database record. For example, at least a portion of the features scores may correspond to a similarity score for a particular label, based on a comparison (e.g., performed by the control circuitry of the processing server 308) between the respective candidate records and the received database record.

At 1212, the control circuitry inputs each of the candidate list of features scores into the match machine learning model, which outputs respective probabilities of each candidate database record matching the received record (e.g., probabilities 162 in FIG. 1).

At 1214, the control circuitry (or the in-database model itself) may pre-preprocess the list of match probabilities (e.g., generate a list of statistical scores based on the respective match probabilities output by the match machine learning model). The statistical scores can include, e.g., mean, maximum, minimum, median, standard deviation, variance, weighted mean, etc.

In some embodiments, prior to generating the list of statistical scores, the control circuitry may determine, based on the respective match probabilities, whether two or more of the candidate database records match the newly received database record. For example, each respective match probability may be compared to an error threshold (e.g., 128 in FIG. 1A), to determine whether the received record matches any of the candidate records identified in the local database (e.g., database 110 in FIG. 1A).

If the control circuitry determines that there are not two candidate records that match the received record, the control circuitry may then determine whether there is one database record that matches the received record (e.g., based on comparing the match probabilities to the error threshold). In some embodiments, if the control circuitry determines that none of the candidate database records match the new database record, the control circuitry may determine that no new database record should be created (or the control circuitry may flag the decision for human review). Alternatively, if the control circuitry determines, based on the output of the match machine learning model, that none of the candidate database records individually match the received record, a new record based on the received record may be generated and stored in the local database.

At 1216, the control circuitry inputs the list of statistical scores into the in-database machine learning model (e.g., trained model 120 in FIG. 1A; model 168 in FIG. 1). At 1218, the in-database learning model outputs a probability that the newly received database record exists in the local database (e.g., probability 121 in FIG. 1A). In some embodiments, such calculated probability may be indicative of a probability of the entire local database containing a database record matching the received database record (e.g., based on the list of identified candidate database records).

For example, there may be a circumstance where, for a list of identified candidate database records, five of such candidate database records are determined to have a 94% probability of matching the received database record. In some embodiments, an out-of-policy machine learning model may also determine that the received database record is an appropriate record for the database. Although it may not be apparent which of the five candidate database records is the record that matches the incoming database record, if the output of the match machine learning model is fed into the in-database machine learning model, the in-database machine learning model may calculate that there is, for example, a 98% chance that one of the candidate database records is a match. Accordingly, even in a case that the database management application cannot determine which of the candidate database records actually matches the received record, a decision not to create a new database record may be bolstered by the calculated 98% probability that the incoming record is within one of the candidate database records.

At 1220, the control circuitry determines whether the probability output by the in-database machine learning model represents an error rate that is lower than an error threshold. The control circuitry may determine the error threshold by referencing a log of previously confirmed decisions, maintained, for example, at the local database or at the computer device 302. At 1222, if the control circuitry determines that the probability output by the match machine learning model is lower than the error threshold, a new record for the local database may be generated and stored at the local database (e.g., local database and new record 172 of FIG. 1). At 1224, if the control circuitry determines that the probability output by the match machine learning model is higher than the error threshold, the control circuitry determines that a new database record should not be created for the local database. In either case, a human reviewer may optionally be given the opportunity to review the database record (e.g., at user interface 370 of the device 302), to confirm that the database record should be generated and stored in the local database or exists in the database and thus should not be generated for the local database. A selection of one of such options may be received from the human reviewer and executed by the control circuitry. The record may then be stored by the control circuitry in the local database (e.g., in local database 310 of FIG. 3).

Figure 13:
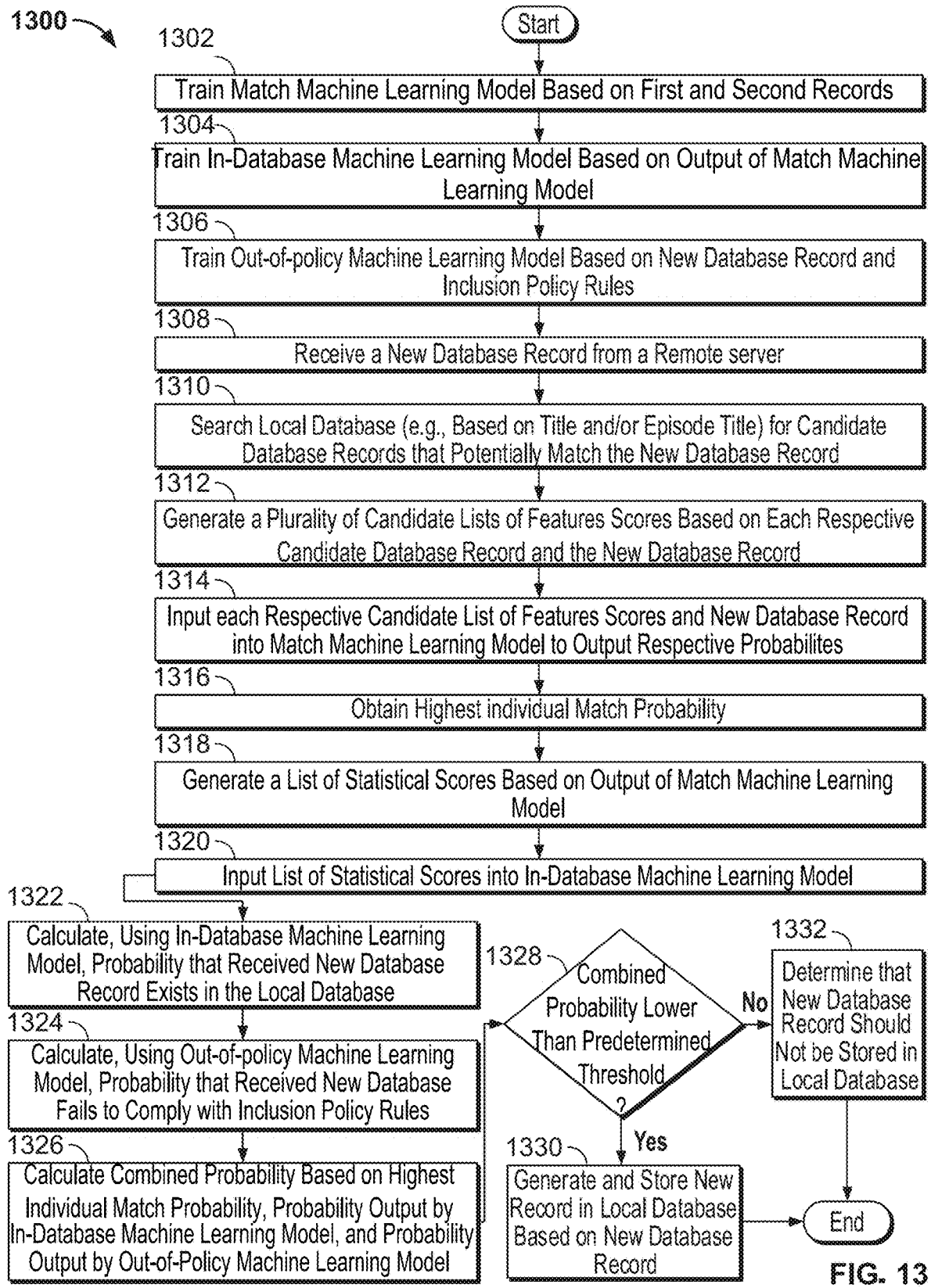
FIG. 13 is a flowchart of a detailed illustrative process for determining whether to generate a new database record based on a received database record, in accordance with some embodiments of this disclosure.

FIG. 13 is a flowchart of an illustrative process for generating a new database record based on a received database record, in accordance with some embodiments of the disclosure. It should be noted that process 1300 or any step thereof could be performed on, or provided by, any of the devices shown in FIG. 3. For example, process 1300 may be executed by computer device 351 (e.g., via control circuitry 353) and/or control circuitry of the processing server 308, as instructed by a database management application that may be implemented on computer device 351, and/or processing server 308 and/or remote server 306, such as to distribute control of database management application operations for a target device among multiple devices. In addition, one or more steps of process 1300 may be incorporated into or combined with one or more steps of any other process or embodiment (e.g., process 1200 of FIG. 12, process 1400 of FIG. 14).

At 1302, control circuitry (e.g., control circuitry of the processing server 308, and/or control circuitry 353, of FIG. 3) trains a match machine learning model, e.g., model 176 in FIG. 1C, based on first and second database records, (e.g., such as with features scores generated by the database management application as between such database records). In some embodiments, the training data set includes training examples labeled as a match or not a match (e.g., previously confirmed by a human reviewer). In some embodiments, the match machine learning model may be trained in advance by other systems, and subsequently shared with the control circuitry.

At 1304, the control circuitry trains an in-database machine learning model (e.g., model 120 in FIG. 1A) e.g., based on match probabilities output by the match machine learning model, which may be input to the in-database machine learning model as computed statistical scores (e.g., scores 702 in FIG. 7). In some embodiments, the in-database machine learning model may be trained in advance by other systems, and subsequently shared with the control circuitry.

At 1306, the control circuitry trains an out-of-policy machine learning model (e.g., 184 in FIG. 1C), such as based on a database record (e.g., database record 182 in FIG. 1C), and inclusion policy rules (e.g., rules 183 in FIG. 1C). In some embodiments, the training data set includes training examples labeled to indicate whether the database record was determined to comply with the inclusion policy rules (e.g., previously confirmed by a human reviewer). In some embodiments, the out-of-policy machine learning model may be trained in advance by other systems, and subsequently shared with the control circuitry.

At 1308, I/O circuitry (e.g., I/O path 352 of FIG. 3, or via I/O circuitry of processing server 308 of FIG. 3) receives a new database record (e.g., a newly received database record 182, from a remote database 181 associated with Netflix™, of FIG. 1C). In some embodiments, the received database record is associated with metadata for a media asset (e.g., 183 of FIG. 1C), and the remote database may be associated with a media asset provider (e.g., Netflix™, Amazon™ Hulu™, etc.).

At 1310, control circuitry of the processing server 308 may search the local database (e.g., local database 188 in FIG. 1C; local database 310 of FIG. 3) for candidate database records that potentially match the received database record. For example, such search may be for database records in the local database having metadata for a "title" or "episode title" label matching that of the received database record.

At 1312, the control circuitry (or the match machine learning model itself) may pre-process the identified candidate database records (e.g., convert raw metadata items of the database records to features scores based on a comparison of the received database record and the respective candidate database record).

At 1314, the control circuitry inputs such candidate database records to the match machine learning model, which calculates respective probabilities of each respective candidate database record matching the received database record. In some embodiments, the control circuitry extracts the highest probability amongst such probabilities for further processing.

At 1316, the control circuitry obtains a highest individual match probability from among the respective probabilities output by the match machine learning model.

At 1318, the control circuitry (or the in-database machine learning model itself) may pre-preprocess the list of match probabilities (e.g., generate a list of statistical scores based on the respective match probabilities output by the match machine learning model). The statistical scores can include, e.g., mean, maximum, minimum, median, standard deviation, variance, weighted mean, etc.

At 1320, the control circuitry inputs the list of statistical scores into the in-database machine learning model (e.g., model 120 in FIG. 1A; model 168 in FIG. 1B).

In some embodiments, prior to inputting such list of statistical scores into the in-database machine learning model, the control circuitry may determine, based on the respective match probabilities, whether two or more of the candidate database records match the newly received database record. For example, each respective match probability may be compared to an error threshold (e.g., 128 in FIG. 1A), to determine whether the received record matches any of the candidate records identified in the local database (e.g., database 110 in FIG. 1A). If the control circuitry determines that there are not two candidate records that match the received record, the control circuitry may then determine whether there is one database record that matches the received record (e.g., based on comparing the match probabilities to the error threshold). In some embodiments, if the control circuitry determines that none of the candidate database records match the new database record, the control circuitry may determine that no new database record should be created (or the control circuitry may flag the decision for human review). Alternatively, if the control circuitry determines, based on the output of the match machine learning model, that none of the candidate database records individually match the received record, a new record based on the received record may be generated and stored in the local database. In some embodiments, if the control circuitry determines that the probability that one of the candidate records matches the newly received record is very high (e.g., 99% or 100% likelihood of matching the newly received record) a decision not to create a database record may be made without utilizing the in-database machine learning model.

At 1322, the in-database learning model outputs a probability that the newly received database record exists in the local database (e.g., probability 121 in FIG. 1A, based on the list of identified candidate database records).

At 1324, a probability of the received database record failing to comply with the inclusion policy rules is output by the out-of-policy machine learning model (e.g., model 122 of FIG. 1A; model 193 of FIG. 1C). In some embodiments, if the out-of-policy machine learning model outputs a probability that indicates a very high likelihood that the received database record should not be included in the local database (e.g., a 99% probability that the asset fails to comply with inclusion policy rules), the control circuitry may determine that the received database record should not be created, and to ignore such received database record (e.g., without sending the record to a manual matching team). Alternatively, the control circuitry may send a notification to a manual matching user (e.g., at device 302 of FIG. 3) to request the user confirm that such received database record should not be included in the local database.

At 1326, the control circuitry calculates a combined probability based on the highest probability amongst the match probabilities obtained at 1316, the in-database probability calculated at 1322, and the compliance probability calculated at 1324. In some embodiments, such combined probability may approximate an error rate.

At 1328, the control circuitry determines whether the combined probability is lower than a predetermined threshold. For example, local database 310 may maintain a log of previously confirmed decisions of whether database records match, and/or whether a database record complies with the inclusion policy rules. Such log may include a subset of human decisions in which an initial decision as to whether the database records match or the database record complies with the inclusion policy rules was made in error. The control circuitry may determine the threshold error rate based on comparing the size of such subset of human decisions made in error to the size of the log of previously confirmed decisions. For example, if the log indicated that of 100 previously confirmed decisions, 11 were initially made in error, an error rate of 11% may be calculated and used as the threshold error value to be compared to the error rate associated with the combined probability.

At 1330, upon determining that the combined probability is lower than the predetermined threshold (e.g., at inclusion decision 199 of FIG. 1C), the control circuitry generates a new record based on the received database record and stores such record in the local database. In some embodiments, the control circuitry forwards the received database record to a manual matching team (e.g., at device 302 of FIG. 3) to confirm that a new database record should indeed be created based on the received database record.

At 1332, the control circuitry, upon determining that the combined probability is higher than the threshold error rate, determines that a new database record should not be created and stored in the local database. In some embodiments, the control circuitry may forward the received database record to a manual matching team (e.g., at device 302 of FIG. 3) to confirm that a new database record should not be created based on the received database record. The record may then be stored by the control circuitry in the local database (e.g., in local database 310 of FIG. 3).

Figure 14:
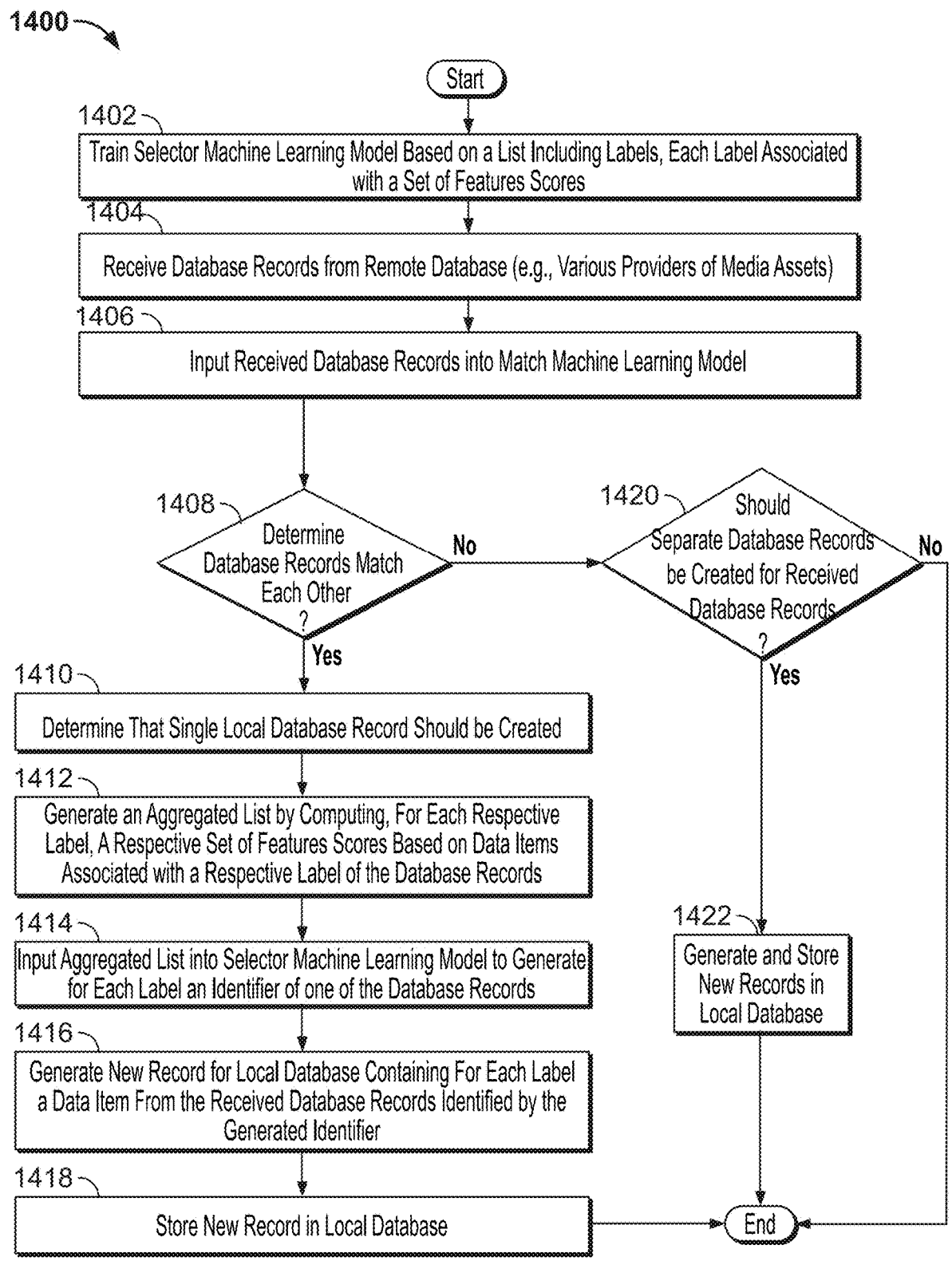
FIG. 14 is a flowchart of a detailed illustrative process for generating a new database record based on multiple received database records, in accordance with some embodiments of this disclosure.

FIG. 14 is a flowchart of an illustrative process for generating a new database record based on multiple received database records, in accordance with some embodiments of the disclosure. It should be noted that process 1400 or any step thereof could be performed on, or provided by, any of the devices shown in FIG. 3. For example, process 1400 may be executed by computer device 351 (e.g., via control circuitry 353) and/or control circuitry of the processing server 308, as instructed by a database management application that may be implemented on computer device 351, and/or processing server 308 and/or remote server 306, such as to distribute control of database management application operations for a target device among multiple devices. In addition, one or more steps of process 1400 may be incorporated into or combined with one or more steps of any other process or embodiment (e.g., process 1200 of FIG. 12, process 1300 of FIG. 13).

At 1402, control circuitry (e.g., control circuitry of the processing server 308, and/or control circuitry 353, of FIG. 3) trains a selector machine learning model (e.g., model 233 of FIG. 2B; model 1104 of FIG. 11), based on multiple database records, each having features scores generated by the database management application. In some embodiments, the training data set includes training examples labeled as a match or not a match (e.g., previously confirmed by a human reviewer). The control circuitry may generate features scores based on a comparison of the multiple database records (e.g., in raw form, such as metadata items for media assets) and/or based on a comparison to database rules or preferences. In some embodiments, the selector machine learning model may be trained in advance by other systems, and subsequently shared with the control circuitry.

At 1404, I/O circuitry (e.g., I/O path 352 of FIG. 3, or via I/O circuitry of processing server 308 of FIG. 3) receives multiple database records from remote databases (e.g., associated with various providers of media assets, such as Netflix™, Hulu™, Amazon™, etc.). In some embodiments, the I/O circuitry receives each database record from a separate remote database. Alternatively, the I/O circuitry receives at least two of such multiple database records from the same database. In some embodiments, the I/O circuitry receives the multiple received database records within a certain predetermined time period, or the I/O circuitry receives a selection from a user to process such received multiple database records together.

At 1406, the control circuitry inputs pairs of database records amongst the multiple database records into the match machine learning model (e.g., model 104 in FIG. 1A).

At 1408, the control circuitry determines whether the multiple received database records match each other (e.g., in order to determine whether a single database record should be created based on such multiple received database records). For example, the control circuitry may input pairs of database record amongst the multiple received database records into a match machine learning model (e.g., model 104 in FIG. 1) to determine whether the database records match. In a case that the control circuitry determines that only a subset (e.g., two or more) of the multiple received database records match, such subset may be used for subsequent processing, while the control circuitry may forward the remainder of the unmatched received database records for further processing at 1420.

At 1420, the control circuitry may determine whether the unmatched received databases records should be added to the local database. In some embodiments, the control circuitry inputs the unmatched received databases records to the match machine learning model, the in-database machine learning model, and the out-of-policy machine learning model (e.g., to undergo the processes discussed in FIGS. 12-13), and such models output a prediction whether the unmatched received databases entries should be added to the local database.

At 1422, the control circuitry, upon determining that the received databases records should be added to the local database, generates and stores the new records in the local database, such as in accordance with the processes discussed in FIGS. 12-13.

At 1410, the control circuitry determines (e.g., based on the output of the match machine learning model) that a single database record should be created for the multiple received database records (e.g., either for all the received multiple database records or a subset of such records). Since the control circuitry determines that the received database records match one another, the control circuitry creates a single database record, thereby enabling storage space to be saved, and more efficient searching of the local database (e.g., local database 256 of FIG. 2B).

At 1412, a respective set of features scores based on data items associated with a respective label of the database records is generated for each respective label to form an aggregated list. The aggregated list (e.g., generated aggregated list 248 of FIG. 2B) may be a list of lists, where each label (e.g., the title of a media asset) is associated with a vector in the form of a list representing the features scores for each database record associated with that label.

At 1414, the aggregated list is input to the trained selector machine learning model (e.g., model 206 of FIG. 2A; model 250 of FIG. 2B). The selector machine learning model generates for each label an identifier of one of the received database records. For example, the identifier indicates that a particular label is associated with the received database record from a particular remote database (e.g., the database associated with Netflix™).

At 1416, based on the generated identifiers, the control circuitry generates a new record (e.g., new entry of metadata items 254 of FIG. 2B) for the local database, where each label of such new record includes a data item from the received database record that is identified by the generated identifier. For example, an identifier for a first label (e.g., title of a media asset) may correspond to the data item associated with such first label in a database record from a first remote database (e.g., Netflix™), while an identifier for a second label (e.g., description of a media asset) may correspond to the data item associated with such second label in a database record from a second remote database (e.g., Hulu™).

At 1418, the record may then be stored by the control circuitry in the local database (e.g., in local database 226 of FIG. 2A, local database 310 of FIG. 3).

In some embodiments, each of the match machine learning model, the in-database machine learning model, the out-of-policy machine learning model, and the selector machine learning model may be integrated into a data pipeline, to perform a series of data processing steps. Each of the machine learning models may output, along with a prediction, a predicted probability of the prediction being correct. The control circuitry may generate features for these models through a matching and manual matching process, e.g., based on provider metadata, candidates returned, human steps to flag assets as out of policy, human results on manual searching, and human asset creation results.

Although the above-mentioned machine learning models are described and illustrated as a gradient boosted decision tree, one of skill in the relevant art would appreciate that other machine learning models may be used for any of the above-mentioned machine learning models (e.g., other boosting techniques, logistic regression, artificial neural networks, nearest neighbors, support vector machine, etc.).

FIG. 15 shows an ideal candidate list of features scores that may be generated (e.g., by the database management application) in some embodiments, based on the generated candidate lists of features scores (e.g., 114 in FIG. 1A). The ideal candidate list of features scores 1504 may be constructed based on identified candidate database records (e.g., 112 in FIG. 1A), and pre-processing may be performed (e.g., by the database management application or the match machine learning model) on the candidate database records prior to inputting the list into the match machine learning model. In some embodiments, based on such input ideal candidate list of features scores, the match machine learning model may output a probability that the received database record is already in the database (e.g., to be used in the calculation of the combined probability at 128 of FIG. 1A as an alternative probability to the probability calculated at 121, or as an additional probability to be used in the calculation at 128). In generating the ideal candidate list of features scores 1504, the database management application may select the best score for each label 1502, amongst the scores for each label in the candidate database records. For example, the database management application may select the best feature scores for the ideal candidate list of features scores (e.g., 1.0 for title similarity, 0.95 for episode title similarity, 0.8 for cast similarity, 0.12 for description cosine distance, 0.9 for description pronoun overlap, 1.0 for genre overlap, 0.7 for duration match, 1.0 for release year match, 1.0 for language match, etc.). In this example, the database management application may perform the aggregating based on a maximum value for each label, although the database management application may additionally or alternatively employ other methodologies in the aggregating or selecting the best score (e.g., based on a minimum, mean, mode, median, weighted mean, etc.). In addition, the database management application may perform aggregation differently for different features (e.g., one feature may be aggregated based on maximum, another feature may be aggregated based on minimum, etc.).

In some embodiments, match machine learning model 104 may receive as input the constructed ideal candidate list of features scores and calculate a probability that such ideal candidate list of features scores matches the received database record 106. Although such ideal candidate list of features scores itself may not be present in the local database, the ideal candidate list may be indicative of whether a match exists in the local database overall. Stated another way, if even an ideal list of candidate features scores, where the best features scores are selectively chosen from multiple candidates, does not match the database record, the database management application may determine that it is unlikely the local database contains a single (e.g., unideal) database record matching the received new database record. On the other hand, if the ideal candidate list of features scores is determined by the match machine learning model to match the newly received database record based on a computed probability, such probability may be used in the determination as to whether a new database record should be generated.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for updating a local database, the method comprising:
   training a match machine learning model to accept as input a first database record and a second database record and output a probability of the first database record matching the second database record;
   training an in-database machine learning model to accept as input a plurality of probabilities computed by the match machine learning model and output a probability that a third database record is in the local database;

training an out-of-policy machine learning model to accept as input a fourth database record and a set of inclusion policy rules and output a probability that the fourth database record fails to comply with the inclusion policy rules;

receiving a fifth database record from a remote database;

identifying, in a local database, a plurality of candidate database records that potentially match the fifth database record;

calculating a plurality of match probabilities by:
for each respective candidate database record, calculating, using the match machine learning model, a respective probability of the respective candidate database record matching the fifth database record;

calculating, using the in-database machine learning model, a probability that the fifth database record is in the local database;

calculating, using the out-of-policy machine learning model, a probability of the fifth database record failing to comply with the inclusion policy rules;

determining, based on a largest of the plurality of match probabilities, the probability that the fifth database record is in the local database, and the probability of the fifth database record failing to comply with the inclusion policy rules that a new record for the local database should be created; and in response to the determining, generating the new record for the local database based on the received fifth database record.

2. The method of claim 1, further comprising:
generating a plurality of candidate lists of features scores by:
for each respective candidate database record of the plurality of candidate database records: generating a respective list of features scores based on the respective candidate database record and the received fourth database record, wherein each feature score is associated with a label,
wherein the calculating of each respective probability of the plurality of match probabilities includes inputting each respective candidate database record and the fourth database record into the match machine learning model as the plurality of candidate lists of features scores.

3. The method of claim 2, wherein each database record includes:
metadata for a media asset, the metadata comprising a plurality of metadata items; and
a plurality of labels, each label associated with a feature score and associated with respective metadata items of the plurality of metadata items,
wherein at least one label corresponds to a movie or show title of the media asset, an episode title of the media asset, a description of the media asset, a genre of the media asset, a duration of the media asset, or a release date of the media asset.

4. The method of claim 3, wherein the identifying of the plurality of candidate database records in the local database that potentially match the fifth database record comprises:
identifying database records in the local database having respective metadata items associated with a show title label or episode title of the media asset matching metadata items associated with a show title label or episode title of the received fifth database record.

5. The method of claim 2, further comprising:
training a word embedding machine learning model to generate respective semantic word vectors representing each word in a corpus of words;

generating, by the word embedding machine learning model, respective semantic word vectors for each word in a set of words from the fifth database record;

calculating a first semantic word vector based on the respective semantic word vectors;

generating, by the word embedding machine learning model, respective candidate semantic word vectors for each word in a set of words from a first candidate database record of the plurality of candidate database records;

calculating a first candidate semantic word vector based on the respective candidate semantic word vectors; and calculating a similarity score as between the first semantic word vector and the first candidate semantic word vector, wherein the similarity score corresponds to a feature score in a first candidate list of features scores of a plurality of generated candidate lists of features scores, the first candidate list of features scores generated based on the first candidate database record and the received fifth database record.

6. The method of claim 1, further comprising:
generating a list of statistical scores based on the plurality of match probabilities,
wherein the calculating of the probability that the received fourth database record is in the local database includes inputting the plurality of match probabilities into the in-database machine learning model as the list of statistical scores.

7. The method of claim 1, wherein the match machine learning model is trained using a plurality of training example database record pairs, each training example database pair associated with an indicator indicating whether the training example metadata pair constitutes a previously confirmed match.

8. The method of claim 1, wherein the out-of-policy machine learning model is trained using a plurality of training examples, each training example including an indicator indicating whether the training example metadata pair fails to comply with the inclusion policy.

9. The method of claim 1, wherein determining that the new record for the local database should be created comprises:
combining the largest of the plurality of match probabilities, the probability of the fifth database record matching at least one of the plurality of candidate database records, and the probability of the fifth database record failing to comply with the inclusion policy rules;

comparing the combined probability to a threshold error rate; and in response to determining that the combined probability is lower than the threshold error rate, determining that the new record for the local database should be created.

10. The method of claim 9, wherein determining the threshold error rate comprises:
maintaining a log of previously confirmed decisions of whether database records match or a database record complies with the inclusion policy rules, the log including a subset of decisions in which an initial decision as to whether the database records match or the database record complies with the inclusion policy rules was made in error; and determining the threshold error rate based on comparing the size of the subset of decisions made in error to the size of the log or previously confirmed decisions.

11. A system for updating a local database, the system comprising:
storage circuitry configured to:
store a plurality of database records in the local database;
input-output (I/O) circuitry configured to:
receive a fifth database record from a remote database;
control circuitry configured to:
train a match machine learning model to accept as input a first database record and a second database record and output a probability of the first database record matching the second database record;
training an in-database machine learning model to accept as input a plurality of probabilities computed by the match machine learning model and output a probability that a third database record is in the local database;
train an out-of-policy machine learning model to accept as input a fourth database record and a set of inclusion policy rules and output a probability that the third database record fails to comply with the inclusion policy rules;
identify, in a local database, a plurality of candidate database records that potentially match the fifth database record;
calculate a plurality of match probabilities by:
for each respective candidate database record, calculating, using the match machine learning model, a respective probability of the respective candidate database record matching the fifth database record;
calculate, using the in-database machine learning model, a probability that the fifth database record is in the local database;
calculate, using the out-of-policy machine learning model, a probability of the fifth database record failing to comply with the inclusion policy rules;
determine based on a largest of the plurality of match probabilities, the probability that the fifth database record is in the local database, and the probability of the fifth database record failing to comply with the inclusion policy rules that a new record for the local database should be created; and
in response to the determining, generate the new record for the local database based on the received fifth database record.

12. The system of claim 11, wherein the control circuitry is further configured to:
generate a plurality of candidate lists of features scores by:
for each respective candidate database record of the plurality of candidate database records: generating a respective list of features scores based on the respective candidate database record and the received fourth database record, wherein each feature score is associated with a label,
wherein the calculating of each respective probability of the plurality of match probabilities includes inputting each respective candidate database record and the fourth database record into the match machine learning model as the plurality of candidate lists of features scores.

13. The system of claim 12, wherein each database record includes:
metadata for a media asset, the metadata comprising a plurality of metadata items; and
a plurality of labels, each label associated with a feature score and associated with respective metadata items of the plurality of metadata items,
wherein at least one label corresponds to a movie or show title of the media asset, an episode title of the media asset, a description of the media asset, a genre of the media asset, a duration of the media asset, or a release date of the media asset.

14. The system of claim 13, wherein in identifying of the plurality of candidate database records in the local database that potentially match the fifth database record, the control circuitry is configured to:
identify database records in the local database having respective metadata items associated with a show title label or episode title of the media asset matching metadata items associated with a show title label or episode title of the received fifth database record.

15. The system of claim 12, wherein the control circuitry is further configured to:
train a word embedding machine learning model to generate respective semantic word vectors representing each word in a corpus of words;
generate, by the word embedding machine learning model, respective semantic word vectors for each word in a set of words from the fifth database record;
calculate a first semantic word vector based on the respective semantic word vectors;
generate, by the word embedding machine learning model, respective candidate semantic word vectors for each word in a set of words from a first candidate database record of the plurality of candidate database records;
calculate a first candidate semantic word vector based on the respective candidate semantic word vectors; and
calculate a similarity score as between the first semantic word vector and the first candidate semantic word vector, wherein the similarity score corresponds to a feature score in a first candidate list of features scores of a plurality of generated candidate lists of features scores, the first candidate list of features scores generated based on the first candidate database record and the received fifth database record.

16. The system of claim 11, wherein the control circuitry is further configured to:
generating a list of statistical scores based on the plurality of match probabilities,
wherein the calculating of the probability that the received fourth database record is in the local database includes inputting the plurality of match probabilities into the in-database machine learning model as the list of statistical scores.

17. The system of claim 11, wherein the match machine learning model is trained using a plurality of training example database record pairs, each training example database pair associated with an indicator indicating whether the training example metadata pair constitutes a previously confirmed match.

18. The system of claim 11, wherein the out-of-policy machine learning model is trained using a plurality of training examples, each training example including an indicator indicating whether the training example metadata pair fails to comply with the inclusion policy.

19. The system of claim 11, wherein in determining that the new record for the local database should be created, the control circuitry is configured to:
combine the largest of the plurality of match probabilities, the probability of the fifth database record matching at least one of the plurality of candidate database records, and the probability of the fifth database record failing to comply with the inclusion policy rules;

compare the combined probability to a threshold error rate; and in response to determining that the combined probability is lower than the threshold error rate, determine that the new record for the local database should be created.

20. The system of claim 19, wherein in determining the threshold error rate, the control circuitry is configured to:

maintain a log of previously confirmed decisions of whether database records match or a database record complies with the inclusion policy rules, the log including a subset of decisions in which an initial decision as to whether the database records match or the database record complies with the inclusion policy rules was made in error; and determine the threshold error rate based on comparing the size of the subset of decisions made in error to the size of the log or previously confirmed decisions.

* * * * *